(12) United States Patent
Stockley et al.

(10) Patent No.: US 11,987,436 B2
(45) Date of Patent: May 21, 2024

(54) PACKAGE AND METHOD FOR COLOR RETENTION OF FRESH MEAT

(71) Applicant: Cryovac, LLC, Charlotte, NC (US)

(72) Inventors: Henry Walker Stockley, Clover, SC (US); Wan Mei Leong, Charlotte, NC (US)

(73) Assignee: Cryovac, LLC, Charlotte, NC (US)

( * ) Notice: Subject to any disclaimer, the term of this patent is extended or adjusted under 35 U.S.C. 154(b) by 69 days.

(21) Appl. No.: 17/917,368

(22) PCT Filed: Apr. 6, 2021

(86) PCT No.: PCT/US2021/025854
§ 371 (c)(1),
(2) Date: Oct. 6, 2022

(87) PCT Pub. No.: WO2021/207113
PCT Pub. Date: Oct. 14, 2021

(65) Prior Publication Data
US 2023/0150749 A1    May 18, 2023

Related U.S. Application Data

(60) Provisional application No. 63/006,252, filed on Apr. 7, 2020.

(51) Int. Cl.
*B65D 81/20* (2006.01)
*B32B 27/08* (2006.01)
(Continued)

(52) U.S. Cl.
CPC .......... *B65D 81/2092* (2013.01); *B32B 27/08* (2013.01); *B32B 27/28* (2013.01);
(Continued)

(58) Field of Classification Search
CPC ............ B65D 81/2092; B65D 81/2084; B65D 81/2076; B65D 81/2069; B65D 81/2007;
(Continued)

(56) References Cited

U.S. PATENT DOCUMENTS

| 3,574,642 A | 4/1971 | Weinke |
| RE30,009 E | 5/1979 | Perdue et al. |

(Continued)

FOREIGN PATENT DOCUMENTS

| EP | 2728328 | 5/2014 |
| GB | 1097637 | 1/1968 |

(Continued)

OTHER PUBLICATIONS

US 6,103,281 A, 08/2000, Delduca et al. (withdrawn)

(Continued)

*Primary Examiner* — Javier A Pagan
(74) *Attorney, Agent, or Firm* — Jason R. Womer

(57) ABSTRACT

The package includes a plurality of food packages (16) continuing fresh meat food products (17). Each food package is vacuum packaged in a case ready package with a permeable film. The case ready package being sealed within a master pouch (12) having a modified atmosphere. The modified atmosphere having an elevated concentration of carbon monoxide. The fresh meat (17) being in the case ready package and not in direct contact with the modified atmosphere. The fresh meat (17) retaining acceptable color within the case ready package after being removed from the master pouch.

20 Claims, 15 Drawing Sheets

(51) Int. Cl.
  *B32B 27/28* (2006.01)
  *B32B 27/30* (2006.01)
  *B32B 27/32* (2006.01)
  *B65B 25/06* (2006.01)
  *B65B 31/04* (2006.01)
  *B65D 65/40* (2006.01)
  *B65D 77/00* (2006.01)
  *B65D 79/02* (2006.01)

(52) U.S. Cl.
  CPC ............ *B32B 27/306* (2013.01); *B32B 27/32* (2013.01); *B65B 25/067* (2013.01); *B65B 31/048* (2013.01); *B65D 65/40* (2013.01); *B65D 77/003* (2013.01); *B65D 79/02* (2013.01); *B32B 2250/246* (2013.01); *B32B 2264/1021* (2020.08); *B32B 2307/724* (2013.01); *B32B 2439/70* (2013.01)

(58) Field of Classification Search
  CPC ........ B65D 81/20; B65D 81/18; B65D 65/40; B65D 65/38; B65D 65/02; B65D 77/003; B65D 79/02; B32B 27/08; B32B 27/06; B32B 27/28; B32B 27/306; B32B 2264/1021; B32B 2307/724; B32B 2439/70; B65B 25/067; B65B 31/048
  See application file for complete search history.

(56) References Cited

U.S. PATENT DOCUMENTS

| | | |
|---|---|---|
| 4,642,239 A | 2/1987 | Ferrar et al. |
| 5,057,434 A | 10/1991 | Prusik et al. |
| 5,368,905 A | 11/1994 | Ohno |
| 5,667,303 A | 9/1997 | Arens et al. |
| 5,686,126 A | 11/1997 | Noel et al. |
| 5,709,472 A | 1/1998 | Prusik et al. |
| 5,779,050 A * | 7/1998 | Kocher ................. B65B 7/2885 206/497 |
| 6,042,264 A | 3/2000 | Prusik et al. |
| 6,183,790 B1 | 2/2001 | Delduca et al. |
| 6,544,925 B1 | 4/2003 | Prusik et al. |
| 7,338,708 B2 * | 3/2008 | Wilburn ................. B32B 27/08 428/347 |
| 7,718,208 B2 * | 5/2010 | Chen ...................... B32B 27/32 426/396 |
| 8,357,414 B2 | 1/2013 | Becraft |
| 8,697,160 B2 * | 4/2014 | Becraft ................. B65D 75/38 426/125 |
| 2003/0054072 A1 | 3/2003 | Merriman et al. |
| 2003/0054073 A1 | 3/2003 | DelDuca et al. |
| 2003/0199095 A1 | 10/2003 | Yuyama et al. |
| 2005/0208184 A1 | 9/2005 | Delduca et al. |
| 2006/0147586 A1 | 7/2006 | Tewari et al. |
| 2006/0228449 A1 | 10/2006 | Tewari |
| 2010/0224508 A1 | 9/2010 | Yuyama et al. |
| 2012/0052165 A1 | 3/2012 | Becraft |
| 2021/0323750 A1* | 10/2021 | Stockley ............... B32B 27/306 |

FOREIGN PATENT DOCUMENTS

| | | |
|---|---|---|
| GB | 1379263 | 1/1975 |
| WO | 9608424 | 3/1996 |
| WO | 0066432 | 11/2000 |
| WO | 0130655 | 5/2001 |
| WO | 2015002963 | 1/2015 |

OTHER PUBLICATIONS

Christina A. Mireles Dewitt, et al., Modified Atmosphere Systems and Shelf Life Extension of Fish and Fishery Products, Published Jun. 29, 2016.

A.C. Venturini, et al., The Effects of Residual Oxygen on the Storage Life of Retail-Ready Fresh Beef Steaks Masterpackaged Under a Co2 Atmosphere, 2016.

* cited by examiner

PACKAGE AND METHOD FOR COLOR RETENTION OF FRESH MEAT

CROSS-REFERENCE TO RELATED APPLICATIONS

This application claims priority to U.S. Patent Application Ser. No. 63/006,252, filed Apr. 7, 2020 and entitled "Package and Method for Color Retention of Fresh Meat," the entirety of which is incorporated herein by reference.

BACKGROUND

The subject matter disclosed herein relates generally to a package and method for packaging fresh meat. More particularly to a package and method in which fresh meat products are packaged in an oxygen permeable package, and a plurality of the individual packages are packaged in a master pouch having a modified atmosphere with elevated carbon monoxide concentrations.

Meat color is an important characteristic of packaged meat products that affects merchantability. Consumers often rely on color as an indicator of meat quality and freshness. The color of meat is related to the amount and chemical state of myoglobin therein. Myoglobin is present in the muscle tissue of all animals and functions to store and deliver oxygen by reversibly binding molecular oxygen, thereby creating an intracellular source of oxygen for the mitochondria. Myoglobin includes an open binding site called "heme" that can bind certain small molecules, such as molecular oxygen or water. The color of a meat product changes based on the amount of myoglobin present and the amount and type(s) of ligand molecule(s) bound to the heme binding site. For example, myoglobin without a molecule bound to the heme site results in a purple-colored molecule called deoxymyoglobin. Further, when oxygen binds to the heme pocket, purple deoxymyoglobin becomes oxymyoglobin, characterized by a red color. In addition, when a water molecule binds to the heme site, the myoglobin molecule turns brown and is referred to as metmyoglobin.

The rate of the metmyoglobin side reaction is affected by a variety of factors such as storage temperature, the muscle type in the cut of meat, the film permeability to oxygen, etc. In packaging of fresh meat products, it is common practice to initially cut and package the meat at a processing facility for subsequent shipment to retail outlets. If meat products are packaged such that ambient air is contained within the article, meat discoloration can result, caused by the conversion of myoglobin to a grayish or brownish metmyoglobin. The discoloration generally renders the meat product unacceptable for consumers. In addition, such exposure to ambient air can ultimately result in spoilage of the meat. To overcome the discoloration problem, meat can be contained in a modified atmosphere package ("MAP"), wherein gases with little or no oxygen are used in the package headspace. Low oxygen MAP results in meat with a purple color due to myoglobin reducing to deoxymyoglobin. Once the MAP is opened and/or oxygen is introduced, the meat blooms by the formation of oxymyoglobin. However, in high barrier vacuum skin packaging, the formation of metmyoglobin is highly accelerated and browning occurs rapidly initially upon vacuum packaging of the oxygenated myoglobin. The consumption of absorbed oxygen by the mitochondria occurs over 24-48 hours, typically, before conversion to the deoxymyoglobin color within the high barrier vacuum skin package. This known meat color chemistry cycle can result in delays for merchandising of vacuum packaged meat at retail grocery stores as time is needed for this conversion.

In instances, meat products are treated directly with carbon monoxide. Modified atmosphere packaging is used to combine the meat product with the modified atmosphere containing carbon monoxide. The modified atmosphere being in direct contact with the meat product. However, due to some food regulations, the carbon monoxide within the package containing the food product is limited to 0.4% by volume.

There is a need to provide a system and method for packaging fresh meat products that helps provide an extended shelf-life of the product for transport, distribution, and retail display while also maintaining good color while placed at a retail display.

The discussion above is merely provided for general background information and is not intended to be used as an aid in determining the scope of the claimed subject matter.

BRIEF DESCRIPTION

A package and method for color retention of fresh meat. The package includes a plurality of food packages continuing fresh meat food products. Each food package is vacuum packaged in a case ready package with a permeable film. The case ready package being sealed within a master pouch having a modified atmosphere. The modified atmosphere having an elevated concentration of carbon monoxide. The fresh meat being in a case ready package and not in direct contact with the modified atmosphere. The fresh meat retaining acceptable color within the case ready package after being removed from the master pouch.

An advantage that may be realized in the practice of some disclosed embodiments of the package is that meat products retain acceptable color while in a case ready package.

In one exemplary embodiment, a package is disclosed. The package comprises: a plurality of food packages continuing fresh meat food products. The plurality of food packages being vacuum packaged in case ready packages comprising a support and a permeable film. The permeable film having an oxygen transmission rate (OTR) of at least 4,000 cc (STP)/m²/day/1 atm at 23° C. and 0% relative humidity (RH) as measured in accordance with ASTM D3985, of at least 5,000 cc (STP)/m²/day/1 atm at 23° C. and 0% relative humidity (RH) as measured in accordance with ASTM D3985, of at least 6,000 cc (STP)/m²/day/1 atm at 23° C. and 0% relative humidity (RH) as measured in accordance with ASTM D3985, of at least 10,000 cc (STP)/m²/day/1 atm at 23° C. and 0% relative humidity (RH) as measured in accordance with ASTM D3985, or of at least 15,000 cc (STP)/m²/day/1 atm at 23° C. and 0% relative humidity (RH) as measured in accordance with ASTM D3985. The plurality of food packages contained within a sealed master pouch being made from a film having an OTR less than 100, 75, 50, 25, 15 or 10 cc (STP)/m²/day/1 atm at 23° C. and 0% relative humidity (RH) as measured in accordance with ASTM D3985. The sealed master pouch comprising a modified atmosphere comprising nitrogen, carbon dioxide, at least 0.8% by volume carbon monoxide and less than 0.05% oxygen. The color retention percentage of the fresh meat food product is at least 90%, 85%, 80%, 75% or 70% measured in accordance with the following formula:

$$\text{Color retention percentage} = \frac{Color_x}{Color\ 1} \times 100$$

Color₁ is the Hunter LAB a-value of the fresh meat food product in the food package measure on the day the food package is removed from the master pouch;

Color$_x$ is the Hunter LAB a-value of the fresh meat food product in the food package measured x days after the food package is removed from the master pouch; and x is at least 3 days.

In another exemplary embodiment, a method of for packaging a product is disclosed. The method comprises the steps of:

a. situating at least one fresh meat food product on a support;

b. vacuum packaging the at least one fresh meat food product between the support and a permeable film to form a case ready package;

i. the permeable film having an oxygen transmission rate (OTR) of at least 4,000 cc (STP)/m2/day/1 atm at 23° C. and 0% relative humidity (RH) as measured in accordance with ASTM D3985, of at least 5,000 cc (STP)/m2/day/1 atm at 23° C. and 0% relative humidity (RH) as measured in accordance with ASTM D3985, of at least 6,000 cc (STP)/m2/day/1 atm at 23° C. and 0% relative humidity (RH) as measured in accordance with ASTM D3985, of at least 10,000 cc (STP)/m2/day/1 atm at 23° C. and 0% relative humidity (RH) as measured in accordance with ASTM D3985, or of at least 15,000 cc (STP)/m2/day/1 atm at 23° C. and 0% relative humidity (RH) as measured in accordance with ASTM D3985;

c. situating a plurality of the case ready package within a master pouch being made from a film having an OTR less than 100, 75, 50, 25, 15 or 10 cc (STP)/m²/day/1 atm at 23° C. and 0% relative humidity (RH) as measured in accordance with ASTM D3985;

d. sealing the case ready package within the master pouch as a modified atmosphere package;

i. the modified atmosphere comprising nitrogen, carbon dioxide, at least 0.8% by volume carbon monoxide and less than 0.05% oxygen;

e. retaining the case ready package within the master pouch for at least 3 days;

f. such that the color retention percentage of the fresh meat food product is at least 90%, 85%, 80%, 75% or 70% measured in accordance with the following formula:

$$\text{Color retention percentage} = \frac{Color_x}{Color\ 1} \times 100$$

Color₁ is the Hunter LAB a-value of the fresh meat food product in the case ready package measure on the day the case ready package is removed from the master pouch;

Color$_x$ is the Hunter LAB a-value of the fresh meat food product in the case ready package measured x days after the case ready package is removed from the master pouch; and x is at least 3 days.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

The term "fresh meat" refers to a meat product and wherein the internal temperature has not been below −1.5° C. As used herein, "meat product" refers to red meat, fish, beef, veal, pork, sausage, cured meats, chicken, lamb, bison, goat, kangaroo, fowl, such as turkey, seafood such as tuna, salmon, tilapia, haddock, cod, trout, halibut, catfish, bass, snapper, grouper, sea bass, flounder, lion fish, perch, pollock, shark, squid, walleye, pike, wahoo, blue fish, marlin, amberjack, cobia, sake, mackerel, mahi mahi, octopus, swordfish, shrimp, lobster, crab, shellfish. In embodiments, the fresh meat is a fresh red meat food product.

As used herein, the term "film" is inclusive of plastic web, regardless of whether it is film or sheet. The film can have a thickness of 0.25 mm or less, or a thickness of from 0.5 to 30 mils, or from 0.5 to 15 mils, or from 1 to 10 mils, or from 1 to 8 mils, or from 1.1 to 7 mils, or from 1.2 to 6 mils, or from 1.3 to 5 mils, or from 1.5 to 4 mils, or from 1.6 to 3.5 mils, or from 1.8 to 3.3 mils, or from 2 to 3 mils, or from 1.5 to 4 mils, or from 0.5 to 1.5 mils, or from 1 to 1.5 mils, or from 0.7 to 1.3 mils, or from 0.8 to 1.2 mils, or from 0.9 to 1.1 mils.

The multi-layer films described herein may comprise at least, and/or at most, any of the following numbers of layers: 2, 3, 4, 5, 6, 7, 8, 9, 10, 11, 12, 13, 14 and 15. As used herein, the term "layer" refers to a discrete film component which is substantially coextensive with the film and has a substantially uniform composition. Where two or more directly adjacent layers have essentially the same composition, then these two or more adjacent layers may be considered a single layer for the purposes of this application. In an embodiment, the multilayer film utilizes microlayers. A microlayer section may include between 10 and 1,000 microlayers in each microlayer section.

The term "seal" refers to any seal of a first region of a film surface to a second region of a film surface, wherein the seal is formed by heating the regions to at least their respective seal initiation temperatures. The heating can be performed by any one or more of a wide variety of manners, such as using a heated bar, impulse electrical energy, hot air, infrared radiation, radio frequency radiation, etc.

Package

Figure 1:
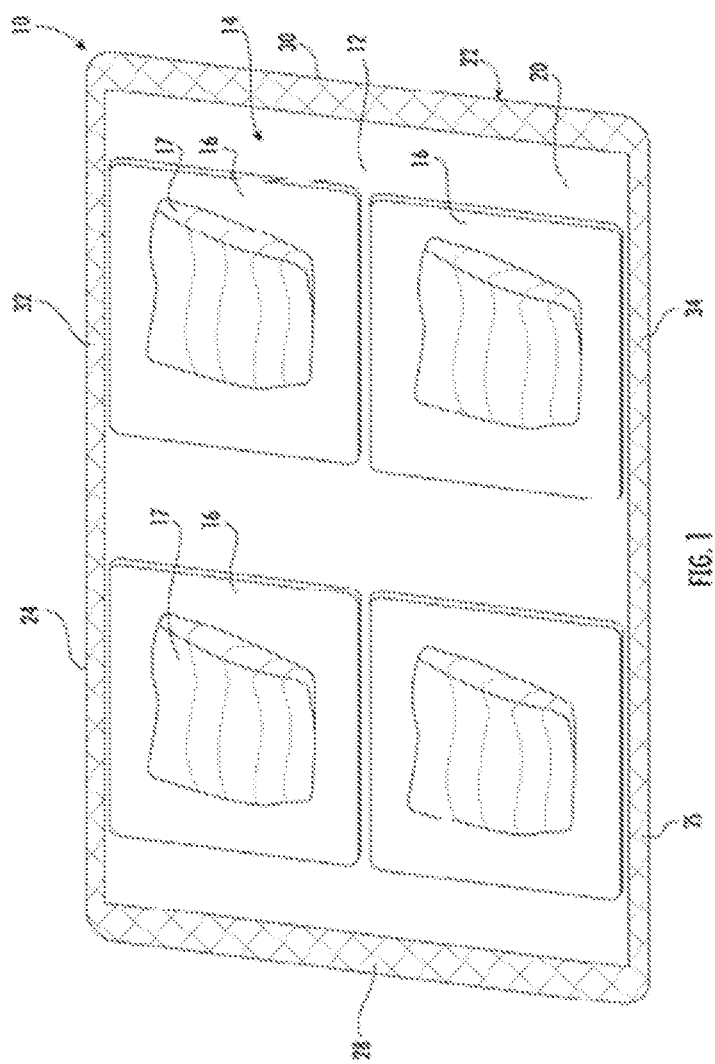
FIG. 1 is an exemplary package for packaging fresh meat products in accordance with at least one embodiment.

With reference to FIG. 1, a system for packaging and transporting a fresh food product is shown and broadly designated by reference character 10. The system includes a pouch 12, also referred to herein as a "master pouch" having an interior space 14 in which a plurality of individual vacuum packages 16 are disposed. Each individual vacuum package 16 includes at least one food product 17, such as a fresh meat. The master pouch has gas barrier properties so as to limit the ingress/egress of gases through the master pouch. Each individual package 16 comprises a gas permeable film having high gas transmission properties so that gases within the interior space of the master pouch can permeate through the gas permeable film. Other permeable vacuum packages with suitable gas transmission can be also be disposed within the master pouch such as gas permeable thermoform-fill-seal packages or gas permeable film pouches, or oriented shrinkable gas permeable bags or bags made from such oriented films. Vacuum skin packaging has come into favor for providing a superior presentation of meat.

The interior space 14 of the master pouch includes a modified atmosphere comprising carbon dioxide ($CO_2$), nitrogen ($N_2$), carbon monoxide (CO) and less than 0.05% by volume residual oxygen based on the total gas content of the modified atmosphere by volume. In an embodiment, the interior space 14 of the master pouch includes a modified atmosphere comprising at least 0.4%, 0.8%, 1.6%, 3.2% or 4% by volume CO based on the total gas content of the modified atmosphere in the interior space 14. In embodiments, the modified atmosphere comprises between 0.4%-4.0%, 0.8%-4.0%, 1.6%-4.0% or 3.2%-4.0% by volume CO based on the total gas content of the modified atmosphere in the interior space 14. In embodiments, the modified atmosphere comprises at least 20%, 30%, 40%, 50%, 60%, 70%, 80%, 90%, or 95% by volume $CO_2$. In embodiments, the modified atmosphere comprises between 20% and 40% by volume $CO_2$. In embodiments, the modified atmosphere comprises between 20% and 85% by volume $CO_2$. Concentrations above 85% by volume of $CO_2$ in some applications resulted in undesirable bubbles forming in the package. Beyond the CO and $CO_2$ concentrations recited in this paragraph, in embodiment, the at least 99.9% of the remaining balance is $N_2$. By way of example, in embodiments where the modified atmosphere in the master pouch is 30% $CO_2$ and 1.6% CO, at least 68.3% of the remaining volume would be $N_2$.

When utilizing a modified atmosphere in interior space of the master pouch the individual packages must have the non-perforated packaging film in contact with product for proper respiration. Therefore, thermoformed packaging, such as vacuum skin packaging is used to create the individual package.

As explained in greater detail below, it has been found that packaging of fresh meat in accordance with embodiments of the present disclosure may help to extend the shelf-life and retain better color of the packaged product. For example, it has been observed that in the packaging of fresh meat may retain acceptable color for at least 3, 4, 5, 6 or 7 days after being removed from the master pouch.

Vacuum Packages

Vacuum packages include case ready packages in which a product is in direct communication with the packaging and the headspace is evacuated such that the packaging conforms to the shape of the packaged product. Suitable vacuum packaging include, but are not limited to thermoform-fill-seal, horizontal form-fill-seal, vacuum shrink bag, vacuum skin package, and thermoformed vacuum skin package. Case ready as used herein refers to a consumer ready package for retail sale in a refrigerated case. The case ready package may or may not be pre-labeled with a retail label for sale to the consumer.

Vacuum skin packaging ("VSP") or other forms of vacuum packaging of food and meat products help preserve food products. Meat products are adversely affected by oxidation and benefit from a low oxygen environment in order to extend shelf life. Vacuum packaging and VSP are processes well known in the art using a thermoplastic packaging material to enclose a food product. The vacuum skin packaging process is in one sense a type of thermoforming process in which an article to be packaged serves as the mold for a forming web. An article may be placed on a rigid or semi-rigid support member, that can be flat or shaped, e.g., tray-shaped, bowl-shaped or cup-shaped (also called "bottom" web), and the supported article is then passed to a chamber where a "top" web is first drawn upward against a heated dome and then draped down over the article. The movement of the top web is controlled by vacuum and/or air pressure, and in a vacuum skin packaging arrangement, the interior of the container is vacuumized before final welding of the top web to the bottom web. Other methods of vacuum skin packaging are known as well.

In embodiments, the vacuum packages are formed by vacuum skin packaging, which is a vacuum forming process for thermoformable films such as polymeric or polymeric containing films. The fresh meat to be packaged is disposed on a supporting member such as a tray or a rigid, semi-rigid, or flexible bottom web or tray. The fresh meat serves as the mold for the thermoformable film which is formed about the product by means of vacuum and/or differential air pressure and heating of the thermoformable film.

In alternate semi-automatic VSP processes generally a vacuum chamber with an open top is used. The product on an impervious backing board is placed on a platform within the vacuum chamber. The top of the chamber is covered by a sheet of film which is clamped tightly against the chamber to form a vacuum tight closure. The chamber is evacuated while the film is heated to its forming and softening temperature. The platform is then raised to drive the product into the softened film and air pressure can be used above the film to force it tightly around the product.

In a variant of this process, after the chamber has been evacuated and the product driven into the heat softened film, the vacuum is released, and ambient air is permitted to enter the chamber so that the thermoplastic film molds more or less onto the product.

Alternatively, a VSP process can be employed in which an article to be packaged is inserted within the lower half of a vacuum chamber on support, a thermoplastic film is placed over the open face of the lower half of the chamber, the chamber is closed and both halves are brought to essentially the same state of vacuum, the film is heated and softened, and then atmospheric air is introduced into the upper half of the chamber so that it alone forces the thermoplastic film down around the product and against the support.

Alternatively, heat softened film is physically moved down over a stationary product and, in connection with air pressure, the softened thermoplastic film is molded onto the product.

In embodiments, the vacuum sealed packages can be treated with hot water shrink the film about the fresh read meat food product (e.g., a hot water dip or a hot water tunnel can be employed).

Other VSP packages utilize a flexible top film comprising a permeable film which is preheated. The flexible top film is advanced forward under a heated dome with a bottom film or formed trays underneath the food product to be skin packaged. It is understood that the trays can be pre-formed or thermoformed as part of the process. The top film is drawn by vacuum upwards into the dome, and immediately thereafter the space around the food is evacuated. Once a certain vacuum pressure has been reached, the top film is released by venting atmospheric air to the top of the dome, thereby collapsing the superheated film onto the food (i.e. skin packaging) and the space around the food is hermetically seal by the latent heat within the film and absence of air due to vacuum pressure. The sealed trays are indexed forward through longitudinal and transverse knives to cut the packages to their final dimensions.

VSP packaging is further described In U.S. Pat. No. Re. 30,009 issued to Perdue et al., the contents of which are incorporated herein by reference in its entirety.

Figure 3:
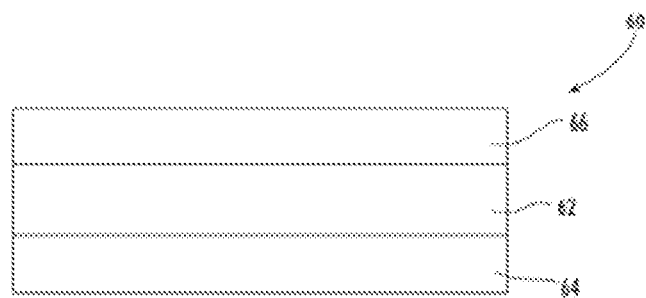
FIG. 3 is a cross-section of a multilayer, oxygen permeable film that may be used to prepare individual packages comprising a food product enclosed therein.
Figure 4:
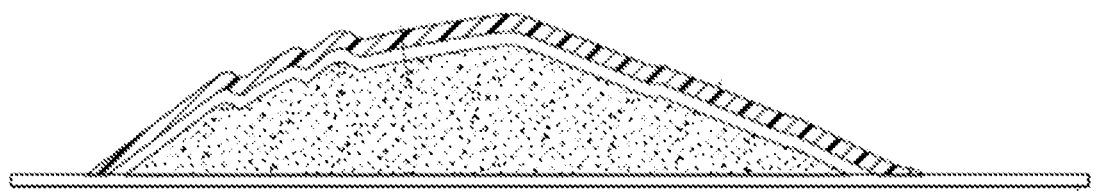
FIG. 4 is an exemplary case ready package in accordance with at least one embodiment.
Figure 5:
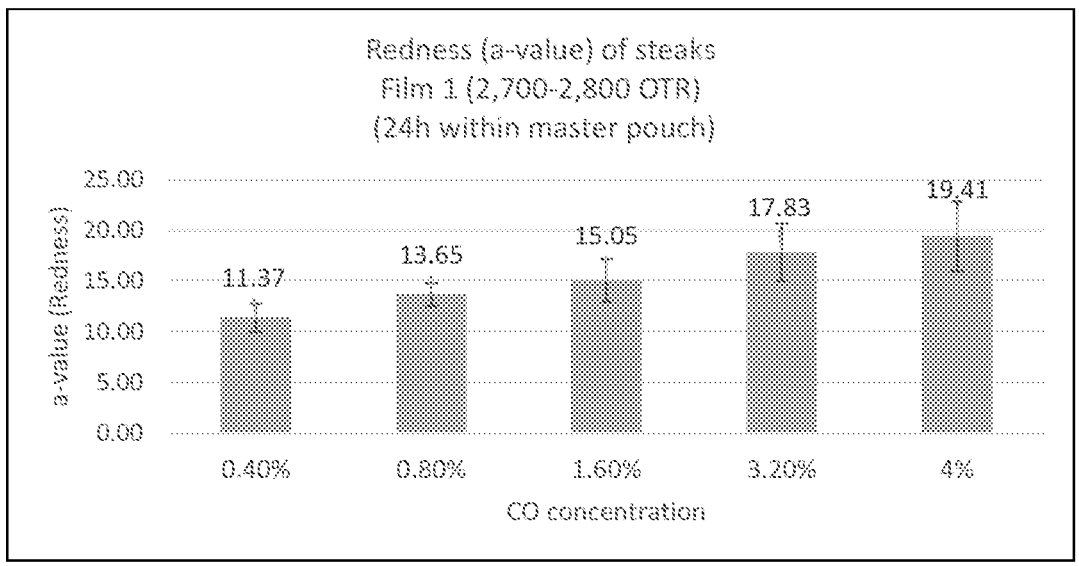
FIG. 5 is a graph showing Hunter a-value measure of beef steak redness and effect of carbon monoxide gas % within an outer gas flushed master pouch after 24 hours.
Figure 6:
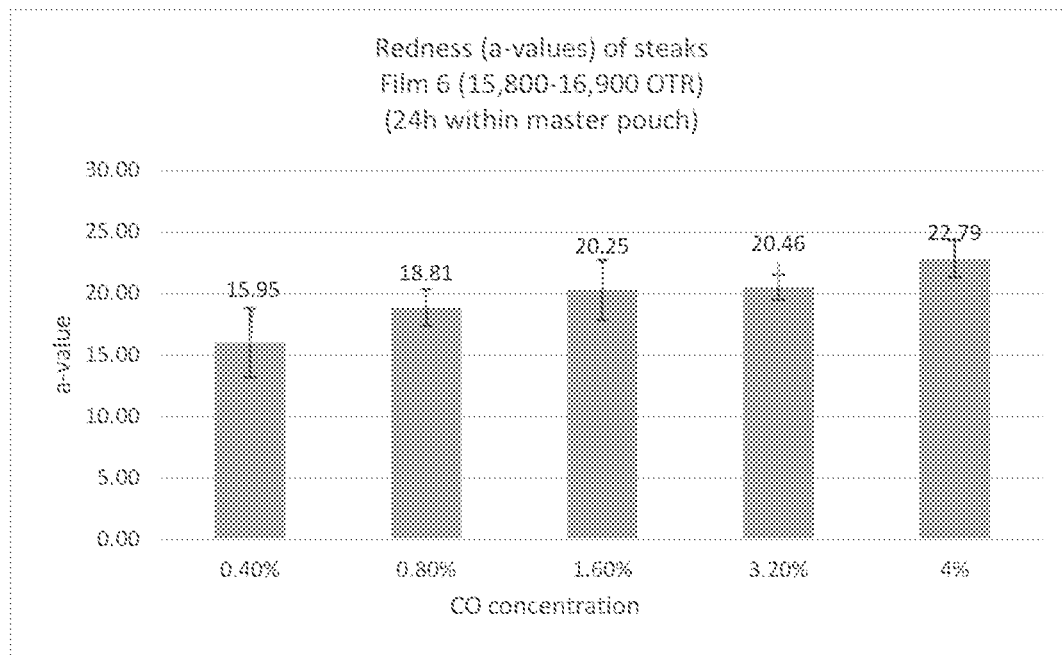
FIG. 6 is a graph showing Hunter a-value measure of beef steak redness and effect of carbon monoxide gas % within an outer gas flushed master pouch after 24 hours.
Figure 7:
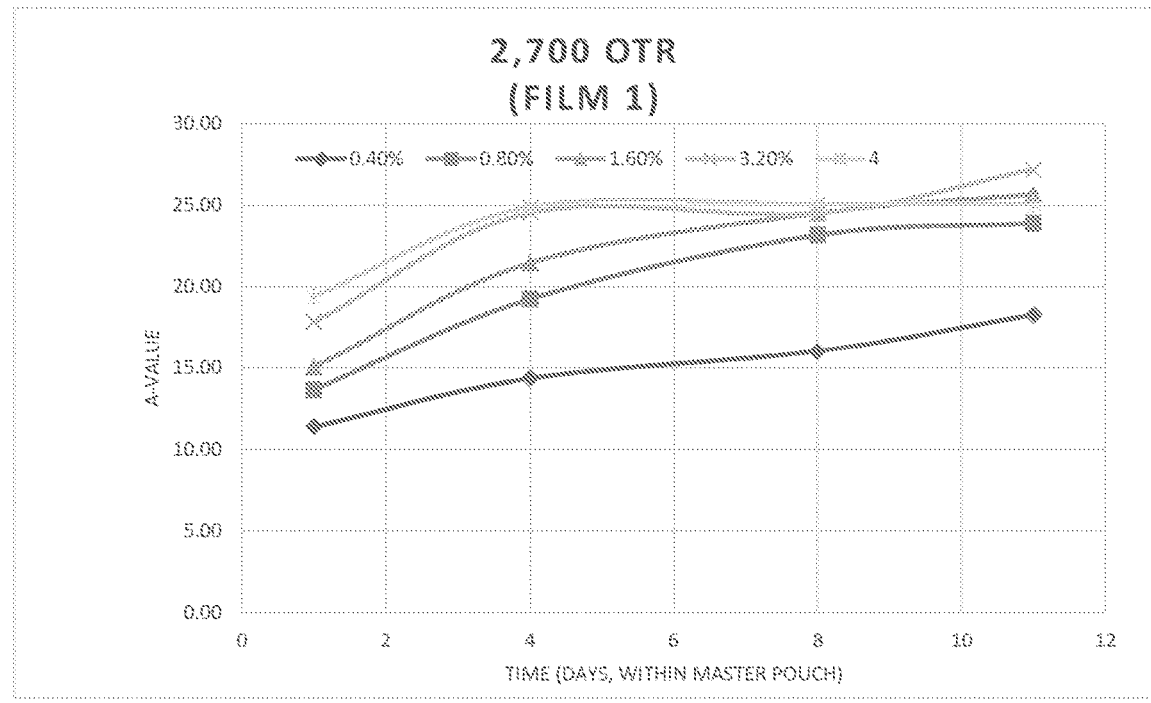
FIG. 7 is a graph showing Hunter a-value measure of beef steak redness and effect of carbon monoxide gas % while contained within a master pouch.
Figure 8:
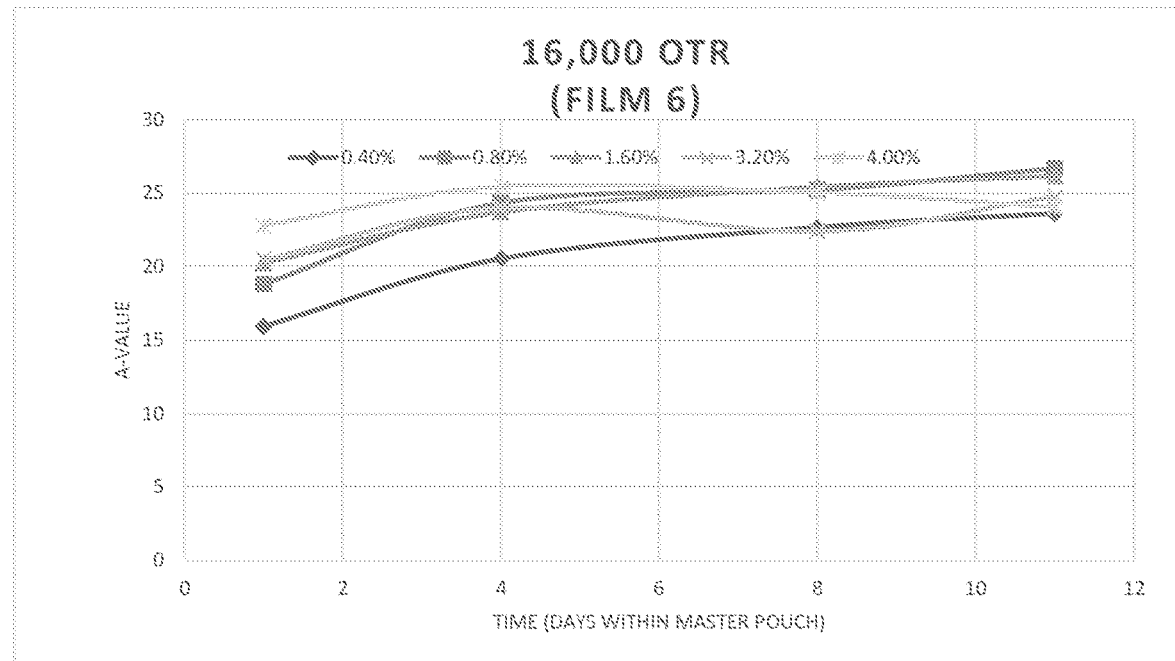
FIG. 8 is a graph showing Hunter a-value measure of beef steak redness and effect of carbon monoxide gas % while contained within a master pouch.
Figure 9:
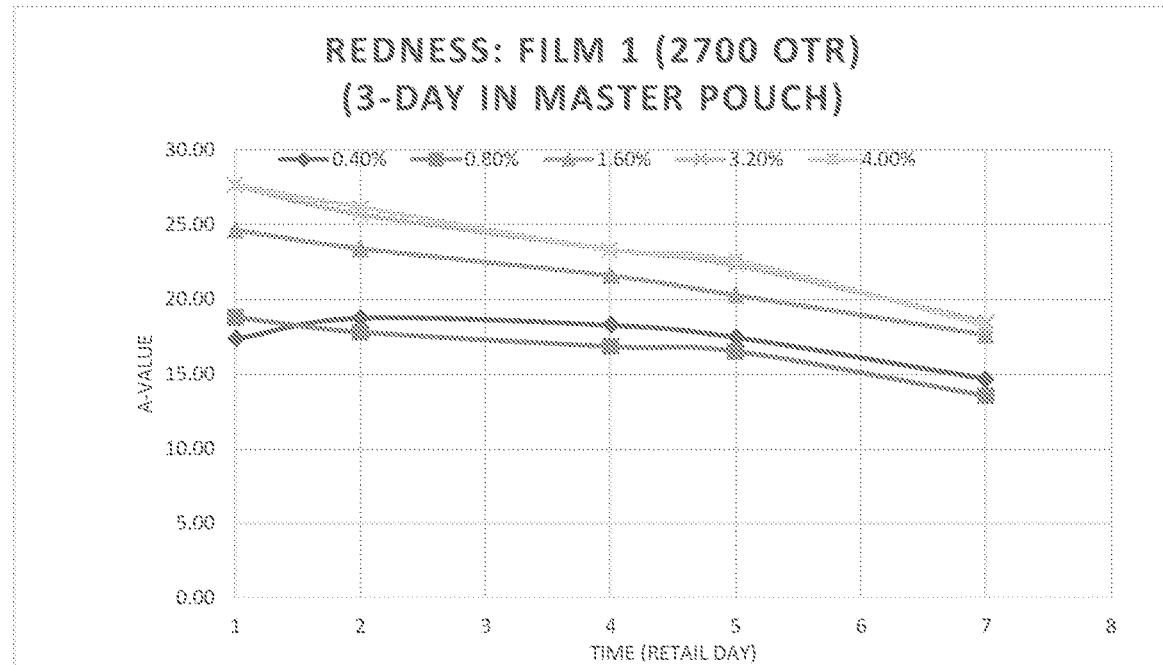
FIG. 9 is a graph showing Hunter a-value measure of beef steak redness and effect of carbon monoxide gas % while in case ready package outside of a master pouch.
Figure 10:
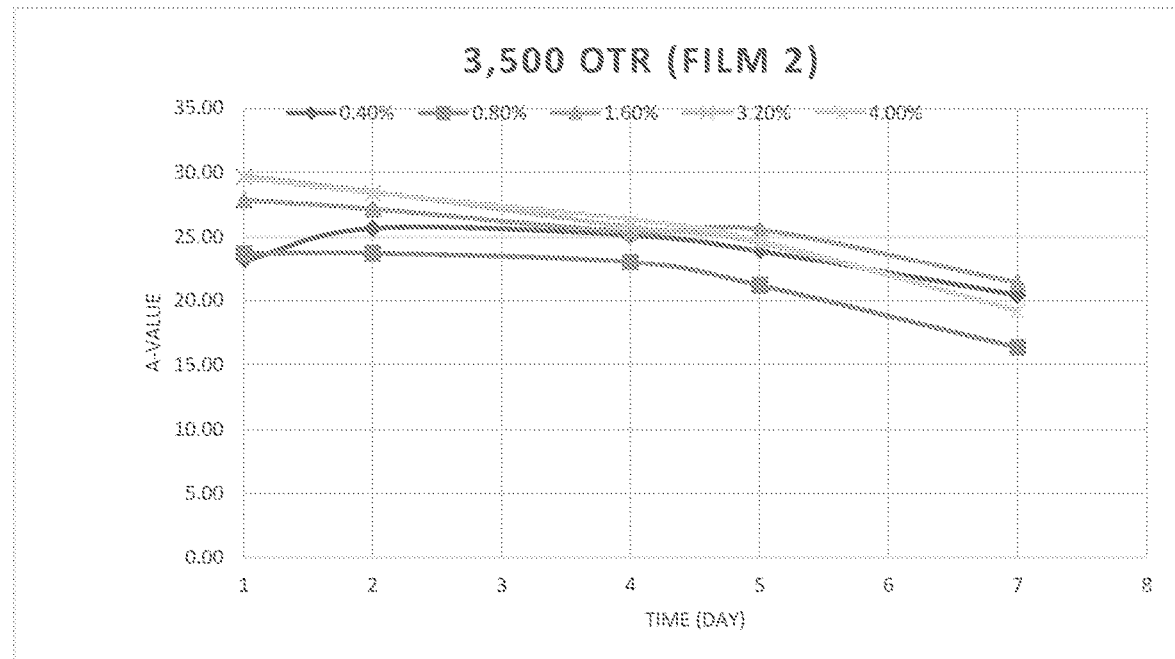
FIG. 10 is a graph showing Hunter a-value measure of beef steak redness and effect of carbon monoxide gas % while in case ready package outside of a master pouch.
Figure 11:
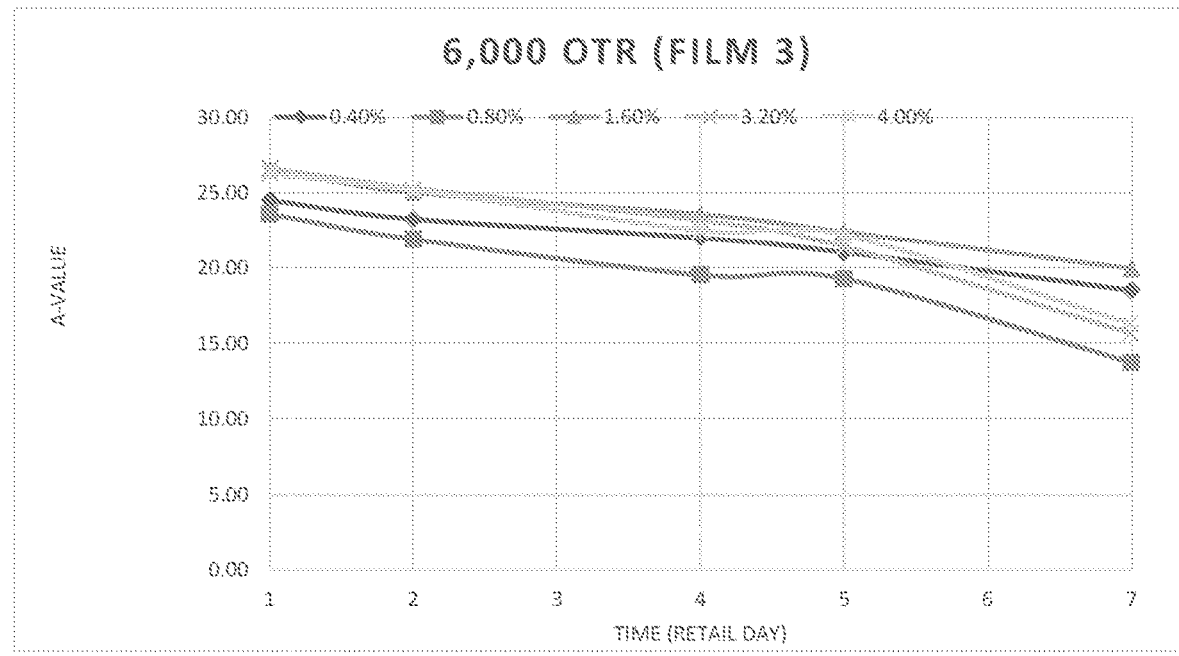
FIG. 11 is a graph showing Hunter a-value measure of beef steak redness and effect of carbon monoxide gas % while in case ready package outside of a master pouch.
Figure 12:
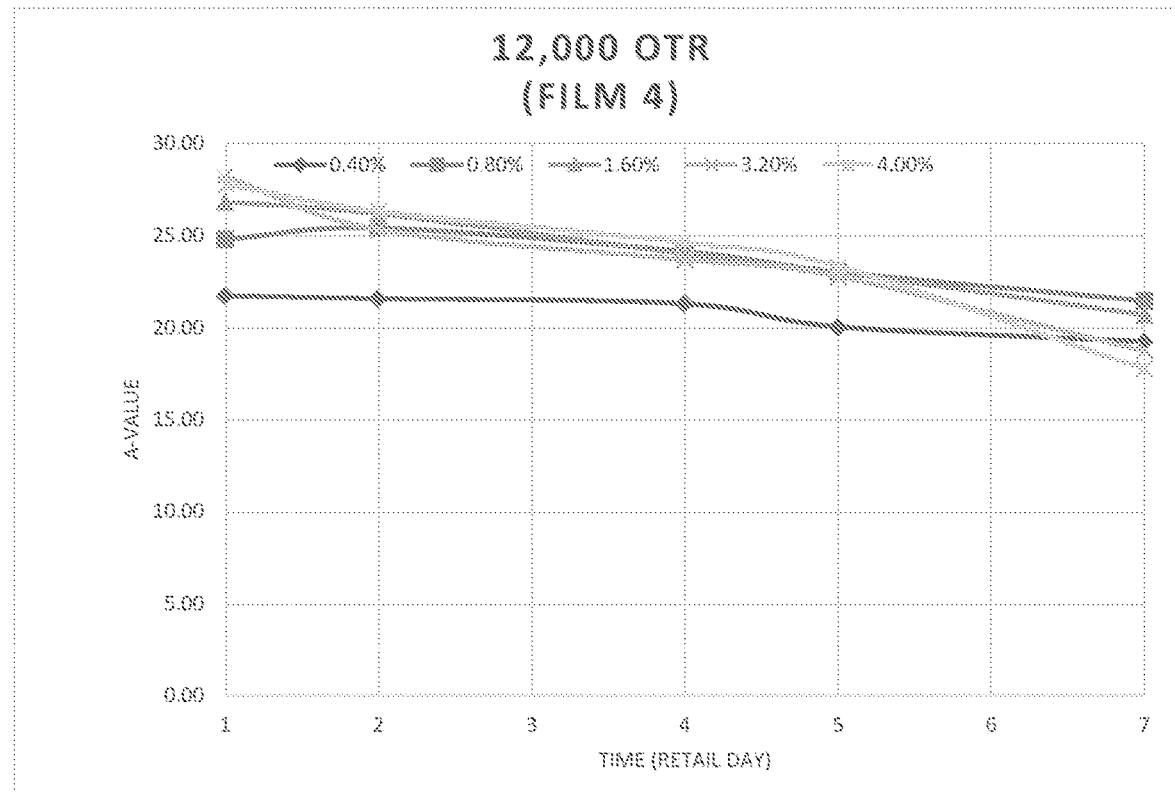
FIG. 12 is a graph showing Hunter a-value measure of beef steak redness and effect of carbon monoxide gas % while in case ready package outside of a master pouch.
Figure 13:
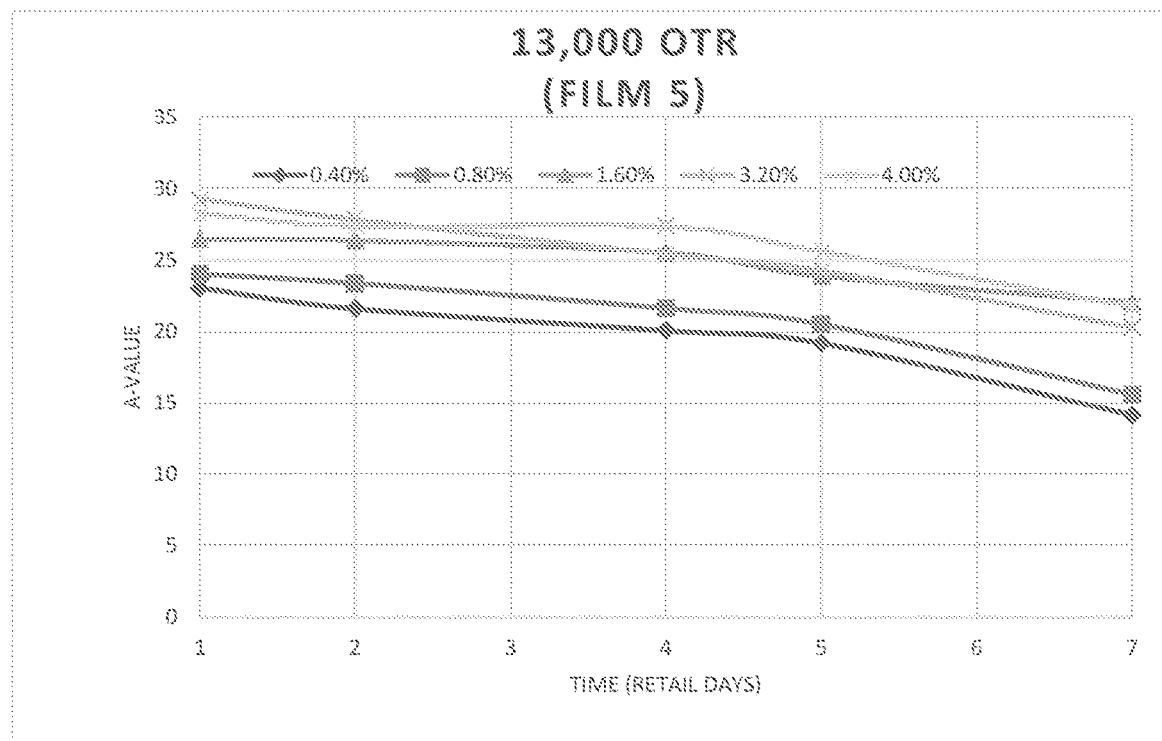
FIG. 13 is a graph showing Hunter a-value measure of beef steak redness and effect of carbon monoxide gas % while in case ready package outside of a master pouch.
Figure 14:
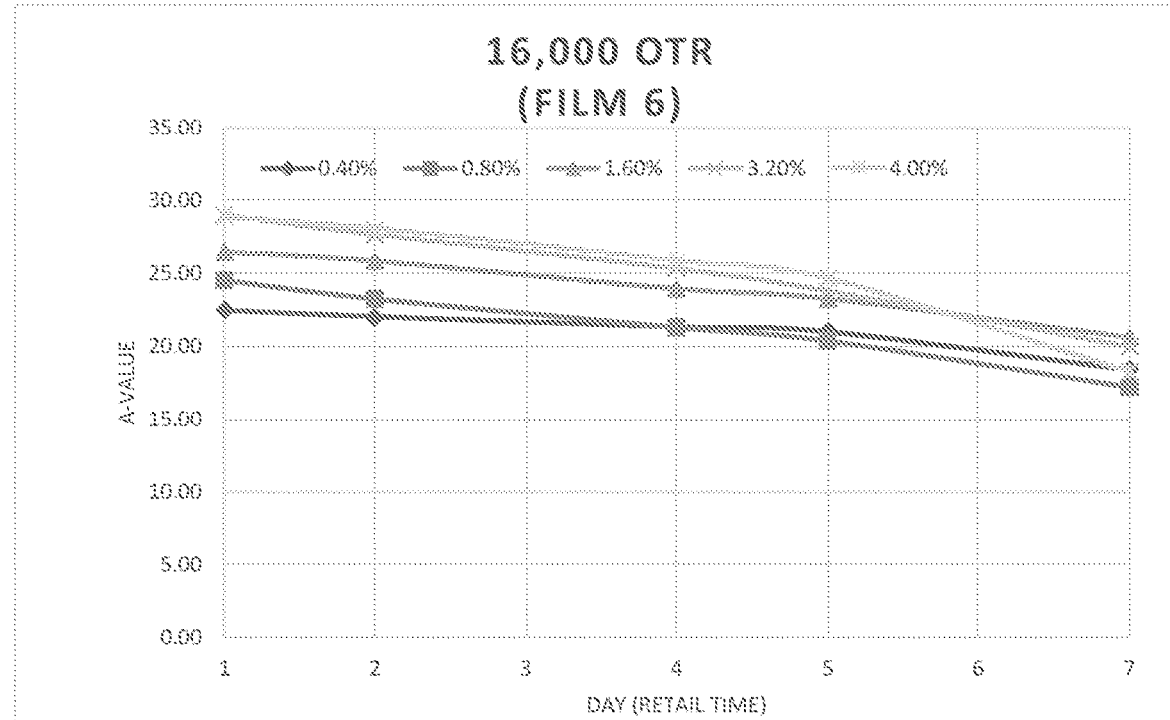
FIG. 14 is a graph showing Hunter a-value measure of beef steak redness and effect of carbon monoxide gas % while in case ready package outside of a master pouch.
Figure 15:
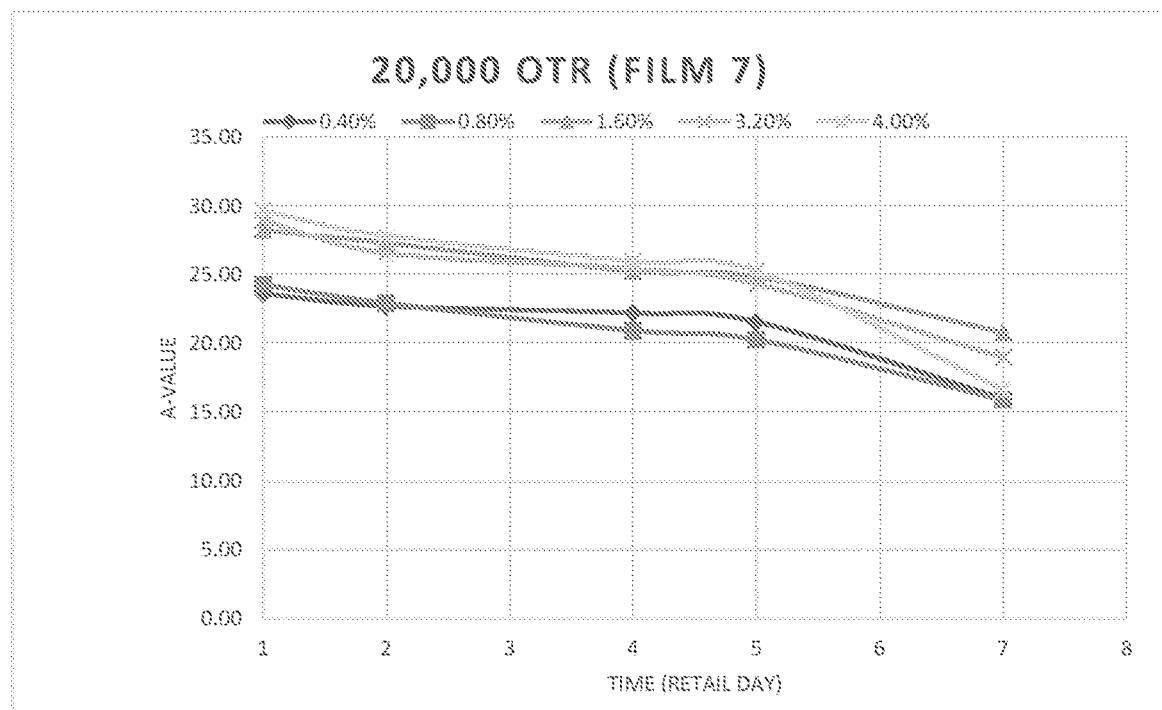
FIG. 15 is a graph showing Hunter a-value measure of beef steak redness and effect of carbon monoxide gas % while in case ready package outside of a master pouch.
Figure 16:
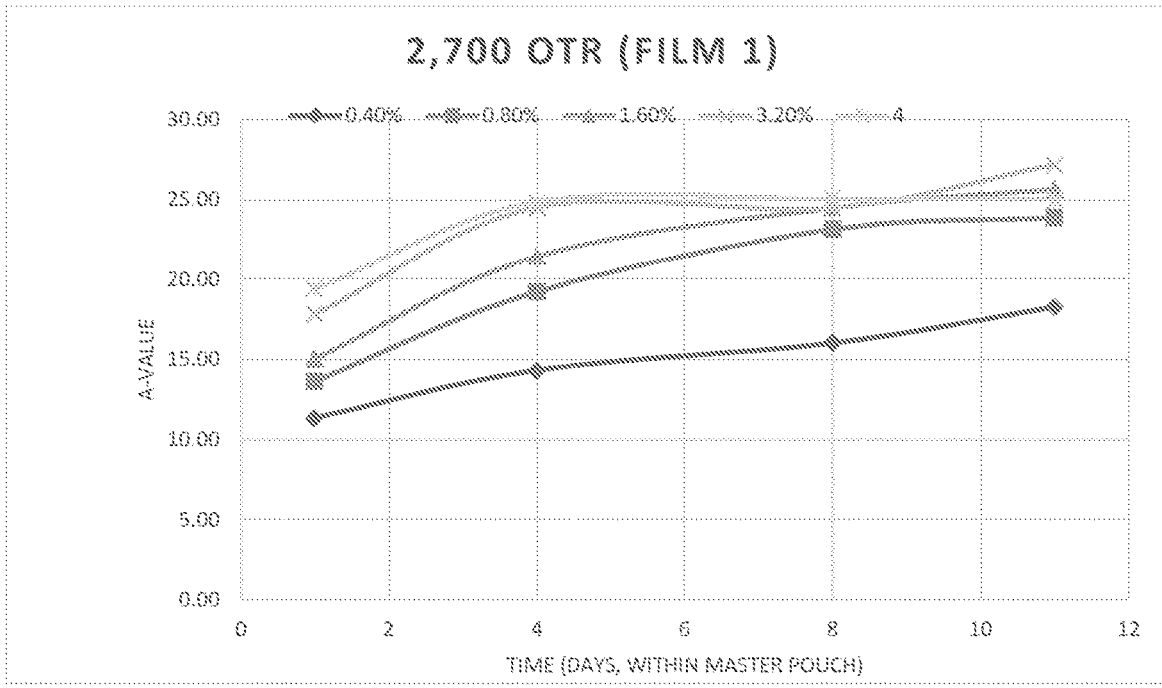
FIG. 16 is a graph showing Hunter a-value measure of beef steak redness and effect of carbon monoxide gas % while contained within a master pouch.
Figure 17:
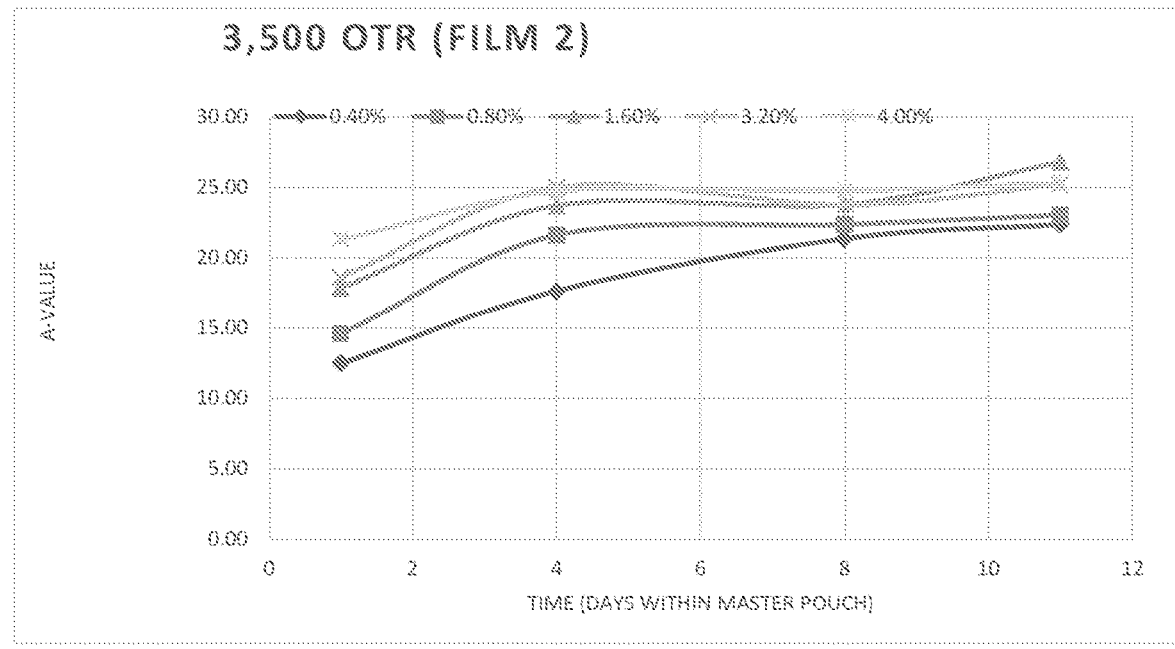
FIG. 17 is a graph showing Hunter a-value measure of beef steak redness and effect of carbon monoxide gas % while contained within a master pouch.
Figure 18:
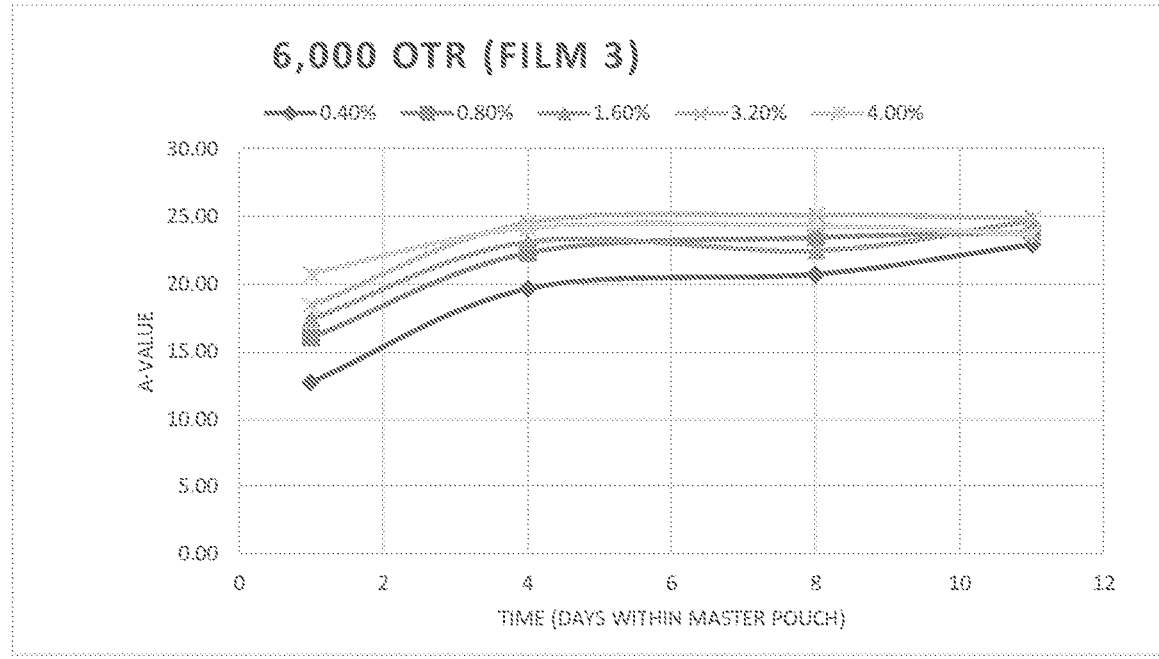
FIG. 18 is a graph showing Hunter a-value measure of beef steak redness and effect of carbon monoxide gas % while contained within a master pouch.
Figure 19:
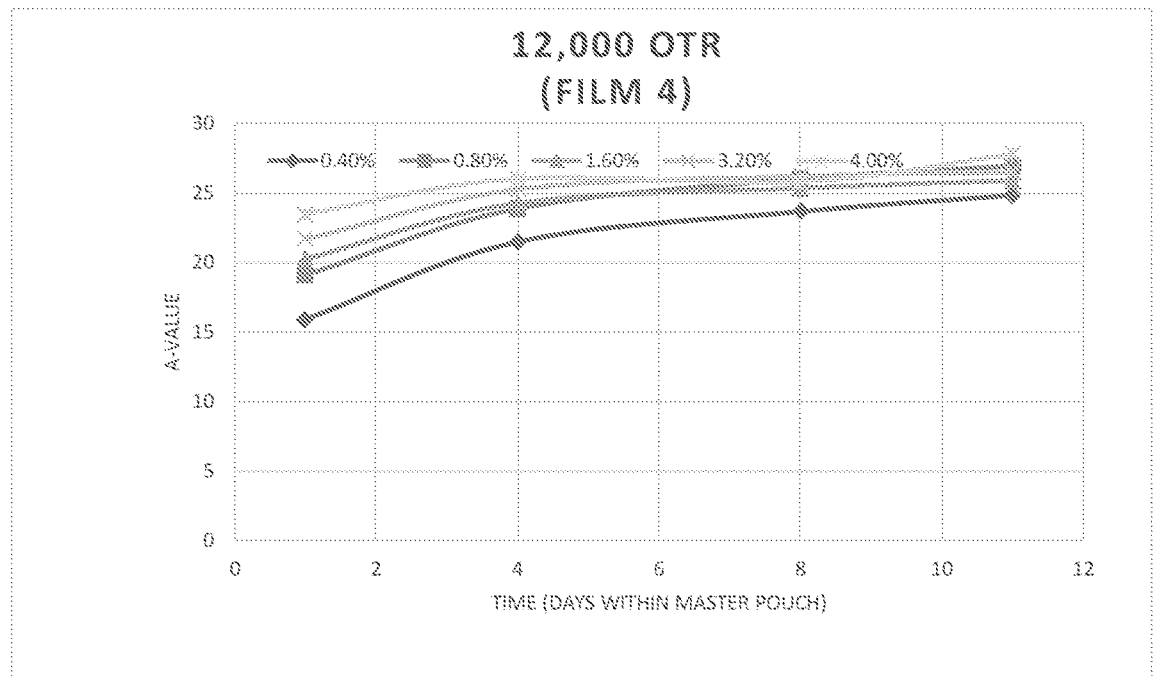
FIG. 19 is a graph showing Hunter a-value measure of beef steak redness and effect of carbon monoxide gas % while contained within a master pouch.
Figure 20:
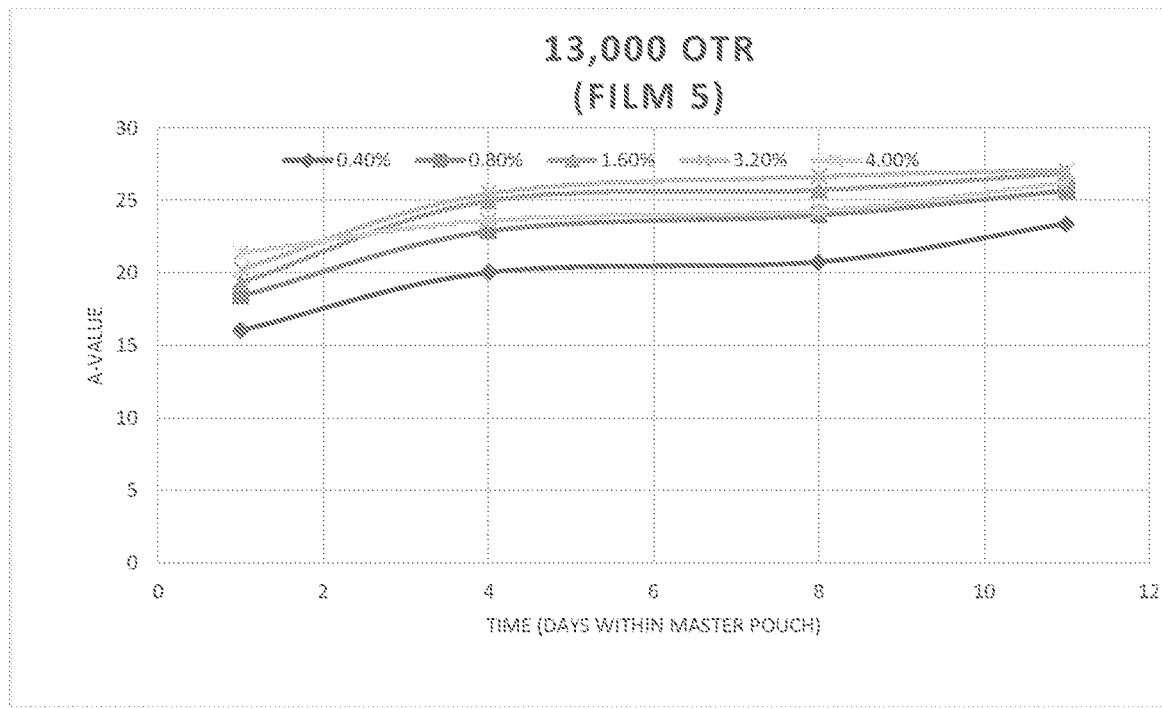
FIG. 20 is a graph showing Hunter a-value measure of beef steak redness and effect of carbon monoxide gas % while contained within a master pouch.
Figure 21:
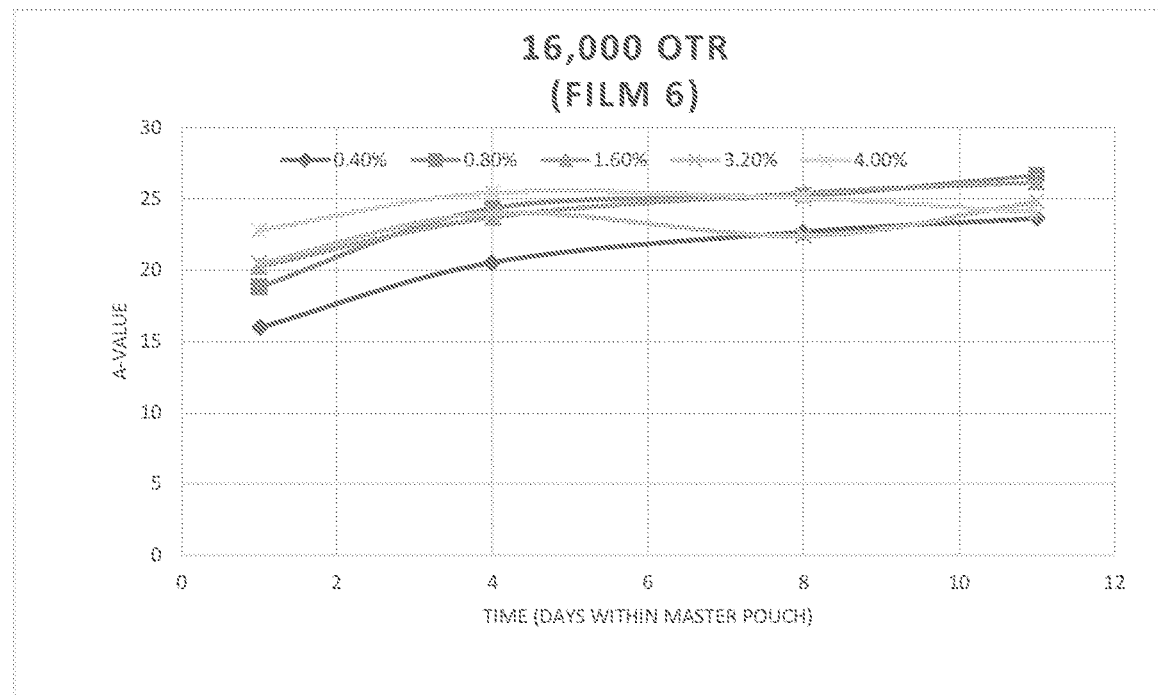
FIG. 21 is a graph showing Hunter a-value measure of beef steak redness and effect of carbon monoxide gas % while contained within a master pouch.
Figure 22:
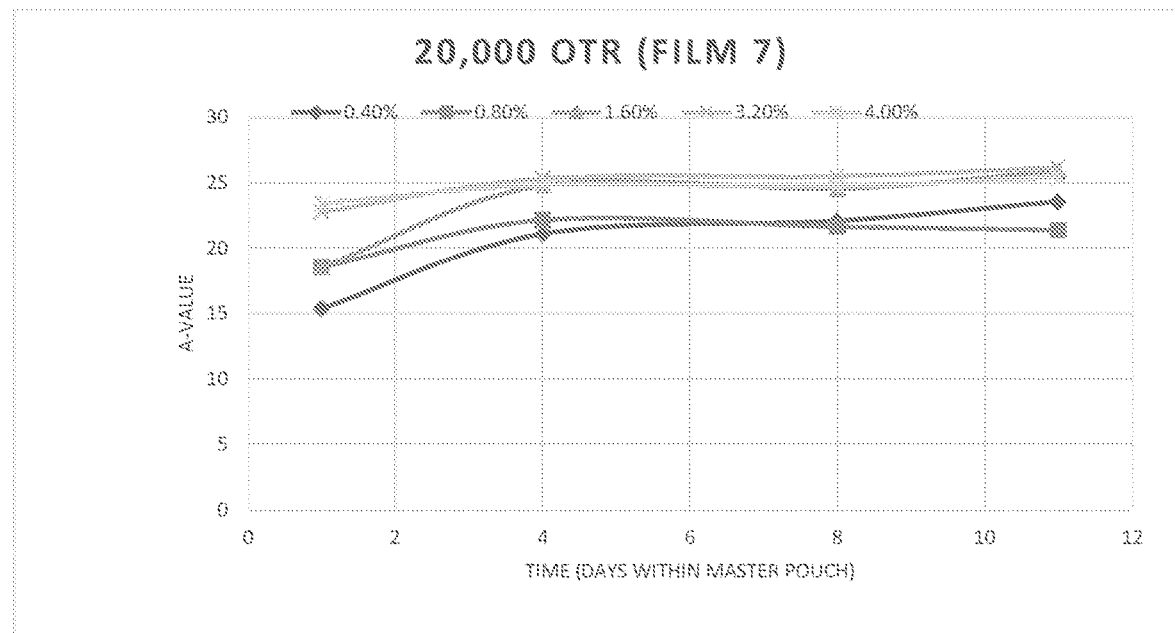
FIG. 22 is a graph showing Hunter a-value measure of beef steak redness and effect of carbon monoxide gas % while contained within a master pouch.
Figure 23:
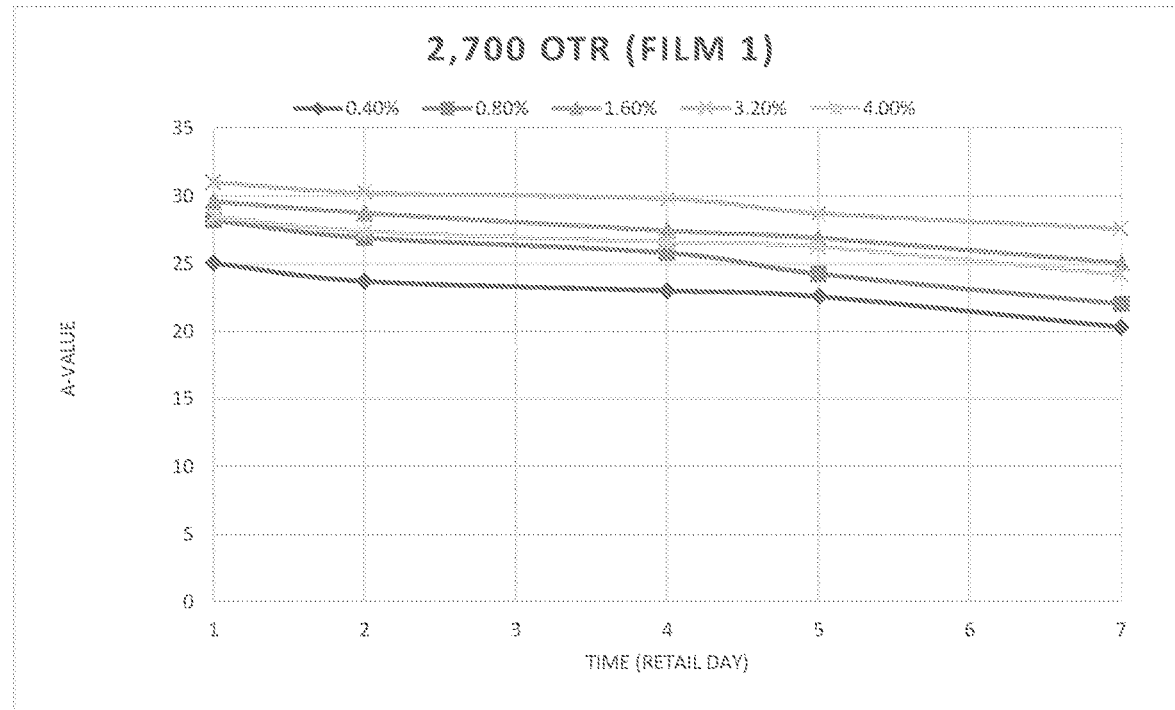
FIG. 23 is a graph showing Hunter a-value measure of beef steak redness and effect of carbon monoxide gas % while in case ready package outside of a master pouch.
Figure 24:
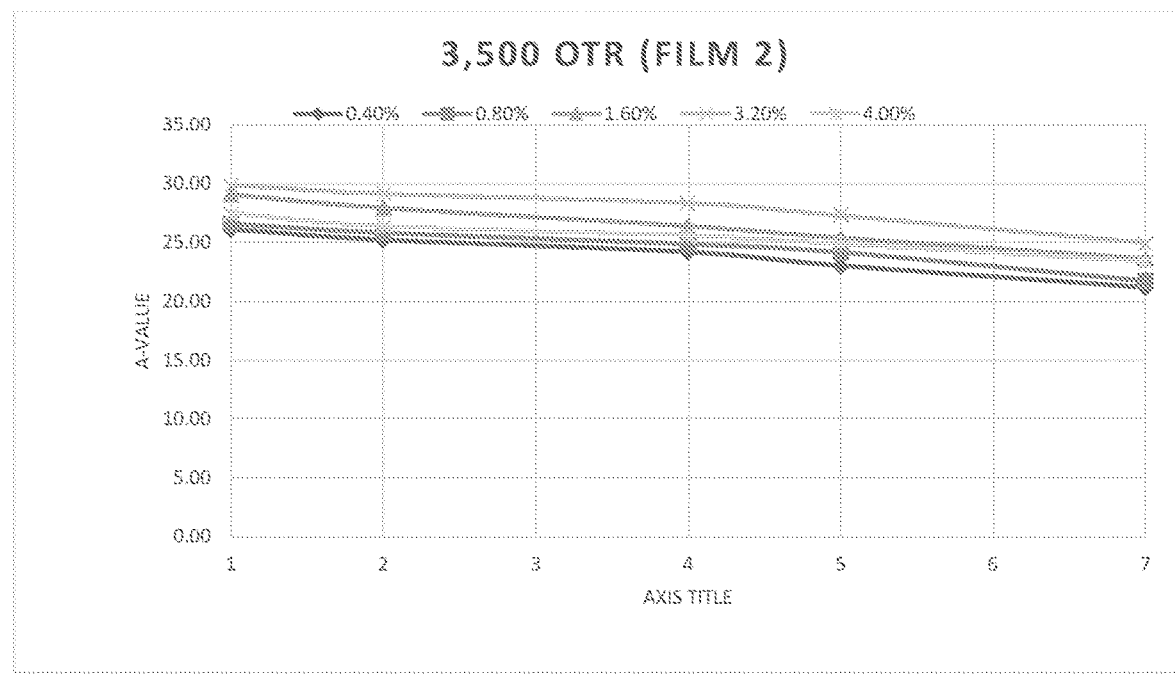
FIG. 24 is a graph showing Hunter a-value measure of beef steak redness and effect of carbon monoxide gas % while in case ready package outside of a master pouch.
Figure 25:
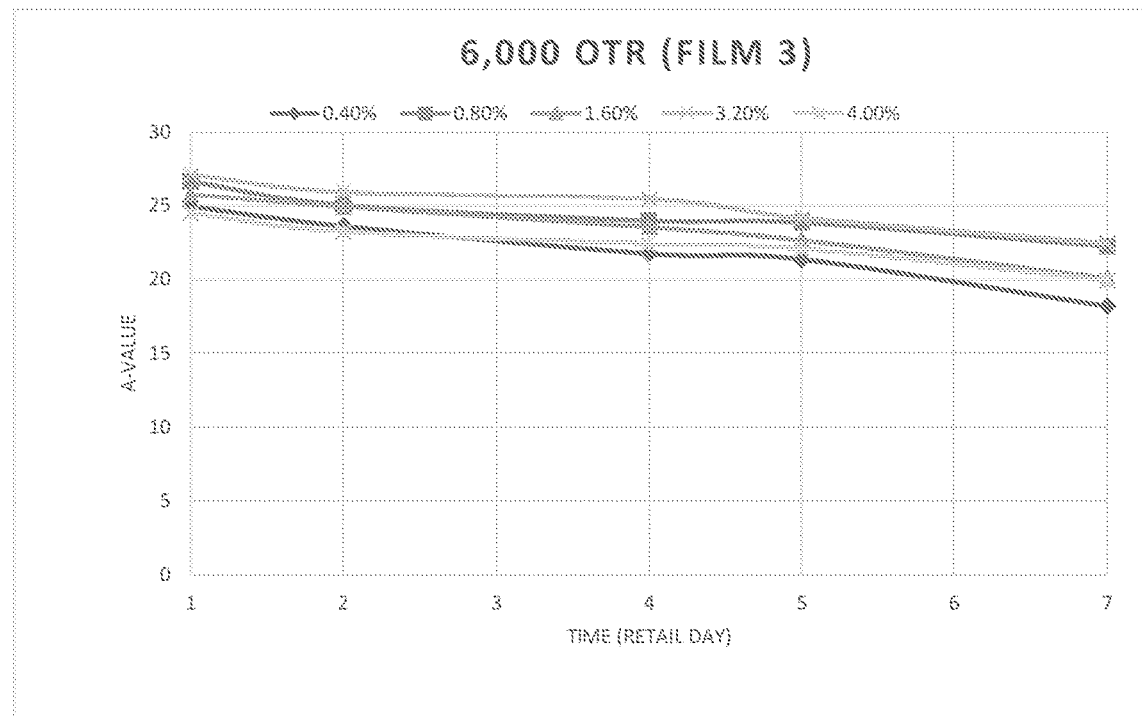
FIG. 25 is a graph showing Hunter a-value measure of beef steak redness and effect of carbon monoxide gas % while in case ready package outside of a master pouch.
Figure 26:
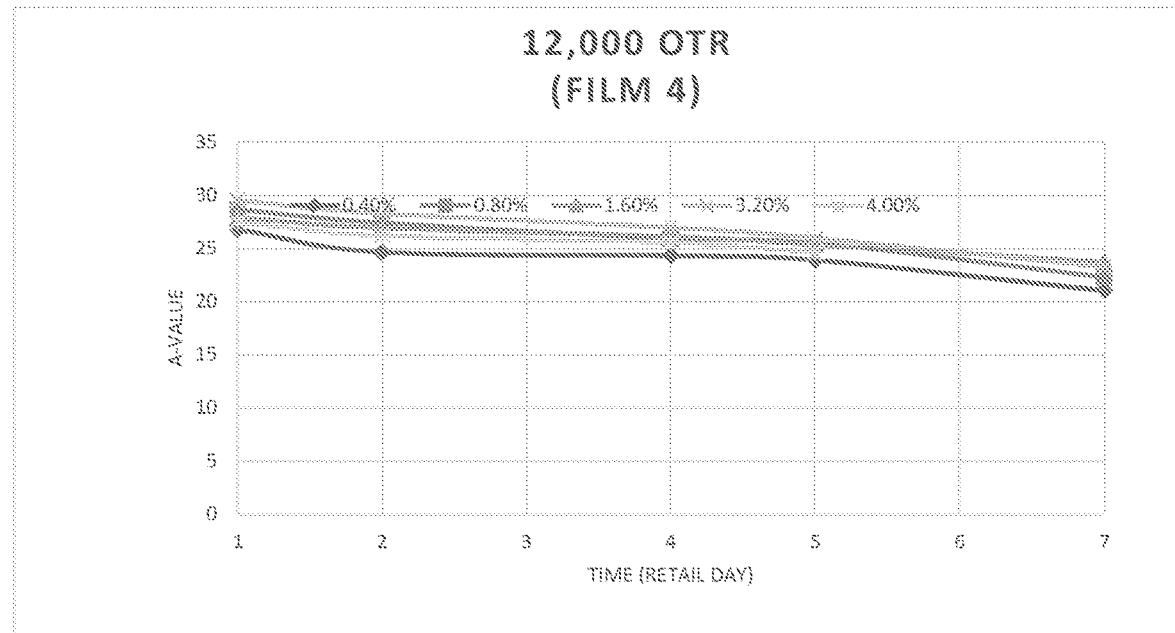
FIG. 26 is a graph showing Hunter a-value measure of beef steak redness and effect of carbon monoxide gas % while in case ready package outside of a master pouch.
Figure 27:
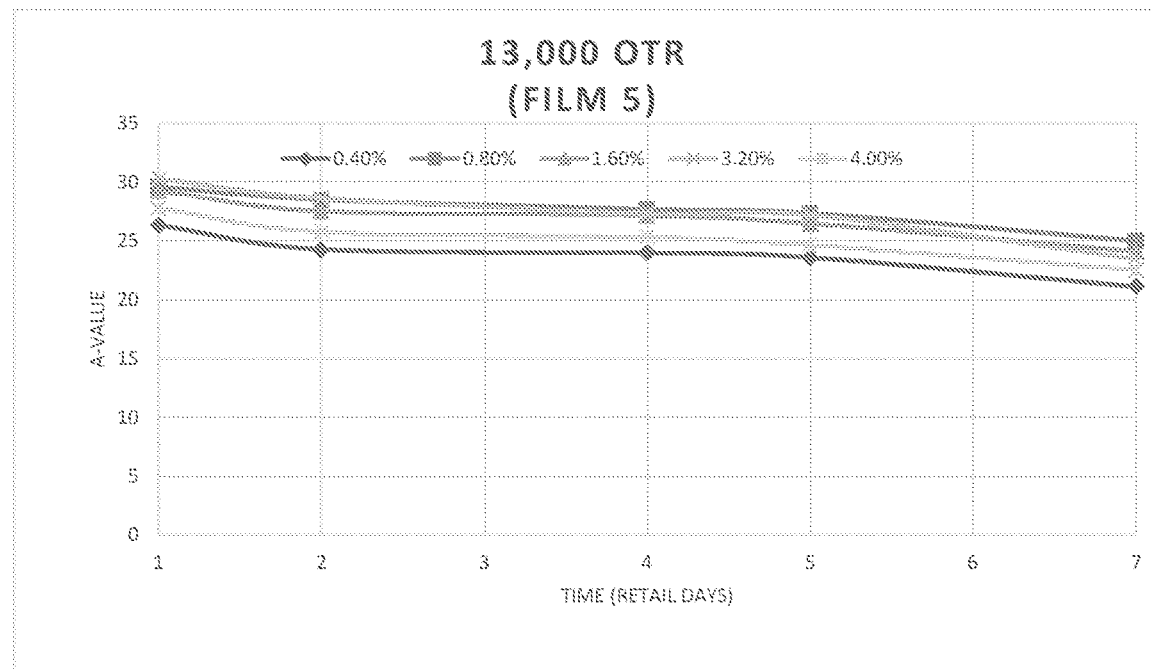
FIG. 27 is a graph showing Hunter a-value measure of beef steak redness and effect of carbon monoxide gas % while in case ready package outside of a master pouch.
Figure 28:
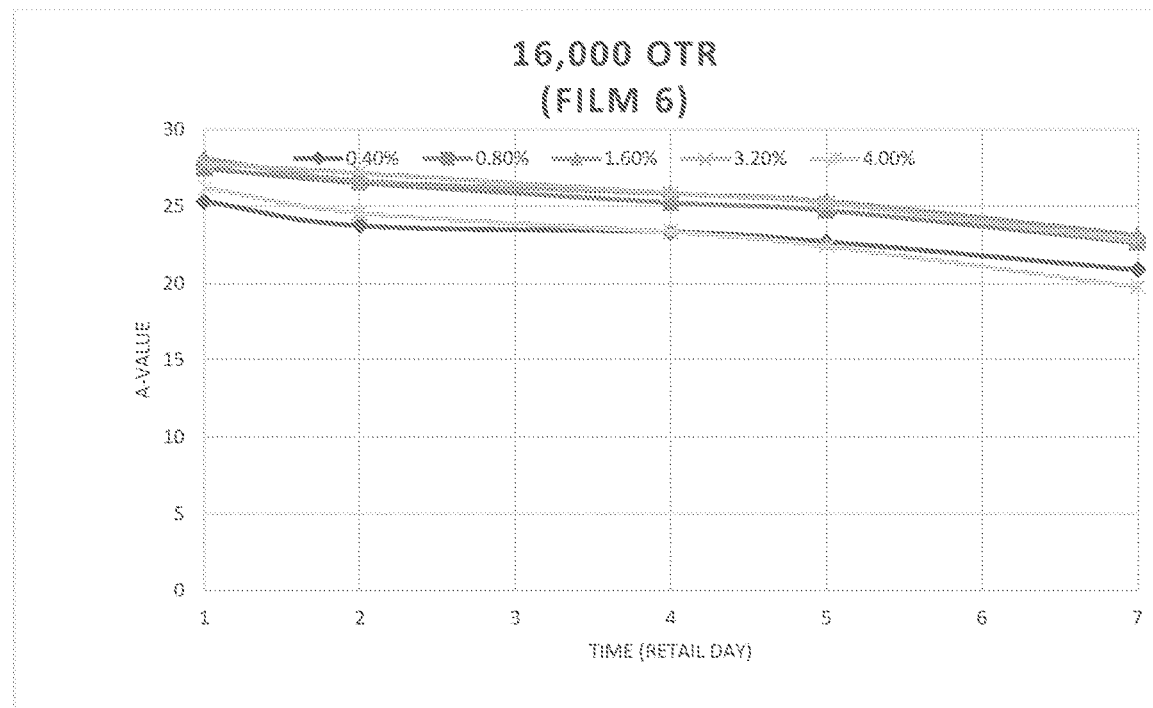
FIG. 28 is a graph showing Hunter a-value measure of beef steak redness and effect of carbon monoxide gas % while in case ready package outside of a master pouch.
Figure 29:
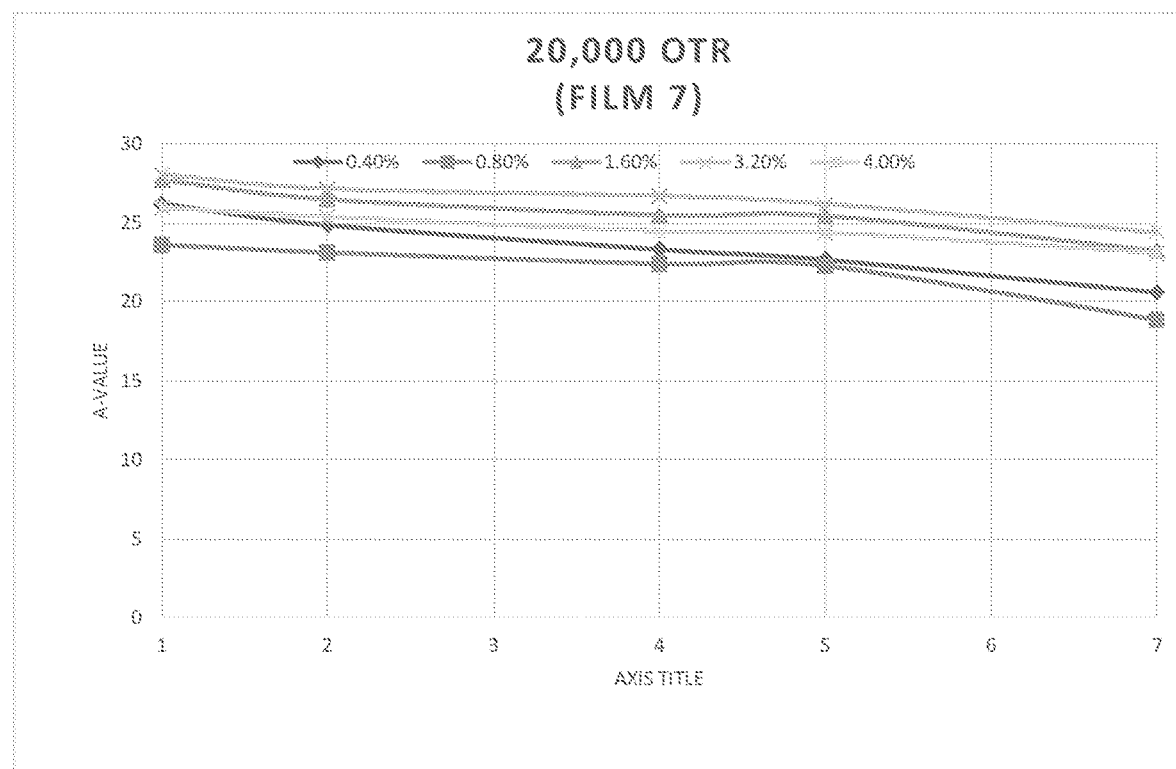
FIG. 29 is a graph showing Hunter a-value measure of beef steak redness and effect of carbon monoxide gas % while in case ready package outside of a master pouch.

Referring back to FIG. 1, the master pouch includes one or more individual packages 16 comprising a food product 17 packaged therein. The individual packages comprise a film that is permeable to gas. With reference to FIG. 3, a cross-section of a three layer film 60 that may be used in preparation of the individual packages 16 is shown. Film 60 may include a core layer 62, outer sealant layer 64, and outer abuse layer 66.

Although FIG. 3 illustrates a three layer film, it should be recognized that the film may include any number of layers depending on the intended use and desired properties provided the permeability of the film is maintained. For example, the film may include additional functional layers and tie layers. In certain embodiments, the film may include from 1 to 10 layers, from 2 to 8 layers, and from 2 to 6 layers.

The lidding film used in the VSP is a permeable film to allow gases to transmit through the film, without the film being perforated. The film material permits the transfer of gas from the exterior of the film (i.e., the side of the film not in contact with the packaged product) to the interior of the film (i.e., the side of the film in contact with the packaged product). In some embodiments, the permeable film has an oxygen transmission rate of at least 2,000 cc (standard temperature and pressure (STP))/m2/24 hrs/1 atm; in some embodiments, at least 4,000 cc(STP)/m2/24 hrs/1 atm; in some embodiments, at least 5,000 cc(STP)/m2/24 hrs/1 atm; in some embodiments at least 6,000 cc(STP)/m2/24 atm; in some embodiments, at least 8,000 cc(STP)/m2/24 hrs/1 atm; in some embodiments, at least 10,000 cc(STP)/m2/24 hrs/1 atm; in some embodiments, at least 15,000 cc(STP)/m2/24 hrs/1 atm; in some embodiments, at least 16,000 cc(STP)/m2/24 hrs/1 atm; in some embodiments, at least 17,000 cc(STP)/m2/24 hrs/1 atm; in some embodiments, at least 18,000 cc(STP)/m2/24 hrs/1 atm; in some embodiments, at least 19,000; and in some embodiments, at least 20,000 cc(STP)/m2/24 hrs/1 atm. The OTR values recited above are measured after the forming or shrinking if the film to form the package.

The thickness of the permeable film may be any total thickness desired, so long as the film provides the desired properties for the particular packaging operation in which the film is used. In certain embodiments, the oxygen permeable film has a thickness from about 1 to 6 mils, and in particular, from about 1.5 to 4 mils, and more particularly, from about 1.8 to 3. 5 mils.

Film transparency (also referred to herein as film clarity) was measured in accordance with ASTM D 1746-97 "Standard Test Method for Transparency of Plastic Sheeting", published April, 1998, which is hereby incorporated, in its entirety, by reference thereto. The results are reported herein as "percent transparency". In embodiments, the films used in the master pouch or product packaging exhibit a transparency of at least 15 percent, or at least 20 percent, or at least 25 percent, or at least 30 percent, measured using ASTM D 1746-97.

Film haze values were measured in accordance with ASTM D 1003-00 "Standard Test Method for Haze and Luminous Transmittance of Transparent Plastics", published July 2000, which is hereby incorporated, in its entirety, by reference thereto. In embodiments, the films used in the master pouch or product packaging exhibit a haze of less than 7.5 percent, or less than 7 percent, or less than 6 percent, measured using ASTM D 1003-00.

Film gloss values were measured in accordance with ASTM D 2457-97 "Standard Test Method for Specular Gloss of Plastic Films and Solid Plastics", published Jan. 10, 1997, which is hereby incorporated, in its entirety, by reference thereto. In embodiments, the films used in the master pouch or product packaging exhibit a gloss, as measured using ASTM D 2457-97, of from 60% to 100%, or from 70% to 90%.

One or more of the layers of the film—or at least a portion of the entire film—may be cross-linked, for example, to improve the strength or change the melt or softening characteristics of the film. Cross-linking may be achieved by using chemical additives or by subjecting one or more film layers to one or more energetic radiation treatments—such as ultraviolet, or ionizing radiation such as X-ray, gamma ray, beta ray, and high energy electron beam treatment—to induce cross-linking between molecules of the irradiated material. Useful ionizing radiation dosages include at least about, and/or at most about, any of the following: 5, 7, 10, 15, 20, 25, 30, 35, 40, 45, 50, 55, 60, 65, 70, 75, 80, 90, 100, 110, 120, 130, and 150 kGy (kiloGray). The cross-linking may occur before the orientation process, for example, to enhance the film strength before orientation, or the cross-linking may occur after the orientation process.

It may be desirable to avoid irradiating one or more film layers. To that end, one or more layers may be extruded and irradiated, and subsequent layers may then be applied to the irradiated substrate, for example, by an extrusion coating process. This will produce an extrusion coating interface, with at least one layer substantially devoid of crosslinks. The films may be oriented in either the machine (i.e., longitudinal), the transverse direction, or in both directions (i.e., biaxially oriented), for example, to enhance the strength, optics, and durability of the film. A web or tube of the film may be uniaxially or biaxially oriented by imposing a draw force at a temperature where the film is softened (e.g., above the vicat softening point; see ASTM 1525) but at a temperature below the film's melting point. The film may then be quickly cooled to retain the physical properties generated during orientation and to provide a heat-shrink characteristic to the film. The film may be oriented using, for example, a tenter-frame process or a bubble process (double bubble, triple bubble and likewise). These processes are known to those of skill in the art, and therefore are not discussed in detail here. The orientation may occur in at least one direction by at least about, and/or at most about, any of the following ratios: 1.5:1, 2:1, 2.5:1, 3:1, 3.5:1, 4:1, 5:1, 6:1, 7:1, 8:1, 9:1, 10:1, 12:1, and 15:1.

In embodiments, the films are heat-shrinkable. As used herein, the phrase "heat-shrinkable" is used with reference to films which exhibit a total free shrink (i.e., the sum of the free shrink in both the machine and transverse directions) of at least 10% at 185° F., as measured by ASTM D2732, which is hereby incorporated, in its entirety, by reference thereto. All films exhibiting a total free shrink of less than 10% at 185° F. are herein designated as being non-heat-shrinkable. The heat-shrinkable film can have a total free shrink at 185° F. of at least 15%, or at least 20%, or at least 30%, or at least 40%, or at least 45%, or at least 50%, or at least 55%, or at least 60%, or at least 65%, or at least 70%, as measured by ASTM D2732. Heat shrinkability can be achieved by carrying out orientation in the solid state (i.e., at a temperature below the glass transition temperature of the polymer). The total orientation factor employed (i.e., stretching in the transverse direction and drawing in the machine direction) can be any desired factor, such as at least 2×, at least 3×, at least 4×, at least 5×, at least 6×, at least 7×, at least 8×, at least 9×, at least 10×, at least 16×, or from 1.5× to 20×, from 2× to 16×, from 3× to 12×, or from 4× to 9×.

The films may be manufactured by thermoplastic film-forming processes known in the art. The film may be prepared by extrusion or coextrusion utilizing, for example, a tubular trapped bubble film process or a flat film (i.e., cast film or slit die) process. The film may also be prepared by applying one or more layers by extrusion coating, adhesive lamination, extrusion lamination, solvent-borne coating, or by latex coating (e.g., spread out and dried on a substrate). A combination of these processes may also be employed.

The one or more individual packages 16 may be prepared using vacuum packaging techniques known in the art. In one embodiment, one or more individual packages 16 are thermoform-fill-seal, horizontal form-fill-seal, vacuum shrink bag (VSB) vacuum skin package (VSP), or thermoformed vacuum skin package (T-VSP). Examples of suitable films that may be used in the preparation of VSB, VSP, and thermoformed VSP are described in U.S. Pat. No. 7,338,708, the contents of which is hereby incorporated by reference.

In one embodiment, the individual package 16 comprises a thermoformed VSP having a rigid or semi-rigid support member onto which an oxygen permeable lidding film has been formed and vacuum sealed.

In certain embodiments, the support member comprises a rigid, semi-rigid or web material. In embodiments, the support member is thermoformed to form individual trays onto which a food product is positioned. The support member may comprise a material that is permeable or impermeable. In embodiments the support is tray comprises PET (including R-PET, CPET and APET), PVC, polypropylene, polyethylene such as high density polyethylene, biobased resin such as starch or poly lactic acid.

In certain embodiments, the individual package 16 may be prepared using a thermoforming process in which a film is used to form a thermoformed support, such as a pocket or cavity, to receive the food product therein, and a permeable film as described herein is then sealed to the support to enclose the food product within the package. The two films may be identical or different from each other with at least one of the two films being sufficiently gas permeable as described herein.

Food products may be arraigned individually in packages, arranged as multiples in a package, stacked in layers and such.

The Master Pouch

In certain embodiments, the master pouch 12 comprises front and back sheets 20, 22 that are arranged in opposing face-to-face relation with each other and are interconnected to define the interior space 14 of the master pouch. The master pouch includes a top end 24, a bottom end 25, and a pair of opposing side seams 28, 30 that extend longitudinally between the top and bottom ends of the master pouch. In the illustrated embodiments, the top end of the pouch is sealed with top seam 32 and the bottom end of the bag is sealed with bottom seam 34. In the context of the disclosure, the term "pouch" is used in a generic sense and should be recognized to include, sacks, bags, satchels, packages, containers, and the like.

As described in greater detail below, the front and back sheets 20, 22 each individually comprise a flexible film comprised of a polymeric material having gas, such as oxygen, barrier properties. In an embodiment, the films comprising the front and back sheet each include liquid, moisture vapor, and gas barrier properties.

In the embodiment shown in FIG. 1, the master pouch is shown in a sealed state with the plurality of individual packages disposed in the interior space of the pouch. As discussed below, embodiments of the master pouch can be prepared in which one of the ends of the master pouch (e.g., the top or bottom end) is left open during manufacturing so as to provide an opening through which individual packages can be introduced into the master pouch during the packaging process. The opening can then be sealed with a heat seal after one or more individual packages have been introduced into the interior space of the master pouch.

Figure 2:
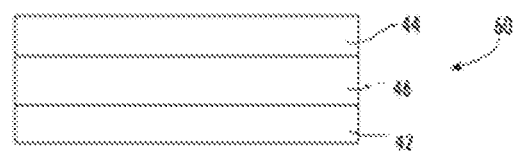
FIG. 2 is a cross-section of a multilayer, oxygen barrier film for use in preparing the master pouch.

The front and back sheets of the master pouch may comprise a monolayer film, multilayer film, or a laminate. In certain embodiments, the multilayer film of the master pouch comprises a multilayer film having low oxygen permeability. In this regard, FIG. 2 illustrates an exemplary multilayer film 40 that may be used for one or more of the front and back sheets of the master pouch. The multilayer film 40 includes a first outer layer 42, also referred to as a "sealant layer", a second outer layer 44, also referred to as an "outer abuse layer", and at least one oxygen barrier layer 46.

In some embodiments, the master pouch is prepared from a laminate having at least one oxygen barrier layer. For example, the laminate may comprise a multilayer structure comprising one or more film layers that are adhesively bonded to each other. In certain embodiments, the laminate may comprise a multilayer film having one or more barrier layers, a sealant layer, and one or more functional layers.

The oxygen barrier layer or combination of oxygen barrier layers typically have low oxygen permeability. For example, the oxygen barrier layer(s) imparts properties to the film of the master pouch such that the master pouch has an oxygen transmission rate of 500 cc(STP)/m2/24 hrs/1 atm or less, and in particular, less than 450, less than 400, less than 350, less than 300, less than 250, less than 200, less than 150, less than 100, less than 80, less than 50, less than 25, less than 10 and less than 5 cc(STP)/m2/24 hrs/1 atm. The term "oxygen transmission rate" or "OTR" or "oxygen permeability" is measured according to ASTM D3985 (latest version as the filing of this disclosure), a test known to those of ordinary skill in the art, and which is hereby incorporated by reference in its entirety. Unless otherwise stated, OTR values provided herein are measured at 0% relative humidity and at a temperature of 23° C. In some embodiments, the sealed master pouch is made from a film having an OTR less than 50 cc(STP)/m2/24 hrs/1 atm., and in particular, less than 10 cc(STP)/m2/24 hrs/1 atm.

In particular, film 40 can be any suitable barrier film that is substantially impermeable to gas (such as oxygen). In one embodiment, the oxygen barrier polymer may be selected from the group consisting of polyvinyl alcohol, ethylene vinyl alcohol copolymer, polyamide, polyvinyl chloride and its copolymers, polyvinylidene dichloride and its copolymers, polyacrylonitrile and its copolymers and polyvinylidene chloride methyl acrylate. In embodiments, other suitable polymers may include poly(vinyl alcohol) (PVOH), polyethylene terephthalate (PET), polyethylene naphthalate (PEN), silica (SiOx), and polyamides such as polycaprolactam (nylon 6), metaxylylene adipamide (MXD6), hexamethylene adipamide (nylon 66), amorphous polyamides such as nylon 6I,6T, as well as various amide copolymers and various blends of the above. Additional oxygen barriers include metal foil layers, metal coatings, depositions of metal, metal oxides such as silica (SiOx), alumina, nano clays and vermiculite can also provide oxygen barrier properties.

Although FIG. 2 illustrates a three layer film, it should be recognized that the film may include any number of layers depending on the intended use and desired properties provided the low oxygen permeability of the film is maintained. For example, the film may include additional functional layers and tie layers. In certain embodiments, the film may include from 1 to 10 layers, from 2 to 8 layers, and from 2 to 6 layers.

Generally, the overall thickness of the film 40 may range from between about 0.5 to 30 mils, and in particular between about 2 to 10 mils, such as from about 2 to 6 mils. In certain embodiments, the thickness of the film may be from about 2 to 3 mils.

In one embodiment the films defining the front and back sheets 20, 22 are superimposed opposite to each other and are then joined to each other along the opposed side seams 28, 30. The side seams, as well as the other seams of the pouch to be described presently, can be formed by any of various methods conventionally used in the packaging industry provided the seams are substantially impervious to the ingress/egress of liquids and gases. In an embodiment, the various seams are substantially impervious to gases such as moisture vapor, oxygen, carbon dioxide, etc. Suitable methods for forming the seams may include adhesive or fusion bonding, such as by forming seals with heat or ultrasonic energy. In the particular embodiment illustrated, the front and back sheets are made from a heat sealable material and the various seams are formed by producing a fusion bond or heat seal between contacting interior surfaces of the front and back sheets using pressure and heat or ultrasonic energy as is well known. Although referred to herein as "heat seals", it should be understood that this term is intended to apply both to seals formed by heating the contacting surfaces with a heated anvil or platen, as well as to heating and fusion produced by other methods, such as application of ultrasonic energy.

During manufacturing of the master pouch, one or both of the ends of the pouch (e.g., the top end 24 and/or the bottom end 26) may be open so that an opening is provided for introducing the individual packages into the interior space of the master pouch. After the individual packages are introduced into the master pouch, a heat seal is applied to bond the inner surfaces of the front and back sheets to each other and thereby form top seam 24 or bottom seam 26 to affect a seal.

Alternatively, a master pouch can be prepared from a single sheet of film in which the film is center folded to form a c-fold in the film, which in turn defines the front and back sheets disposed opposite each other. In other embodiments, the front and back sheets may be formed from a blown film having a tubular shape in which the tube is cut transversely at predefined lengths to define the opposing top and bottom ends of each master pouch.

In embodiments the master pouch is thermoformed master pouch with at least one thermoformable barrier film that creates a pocket to fill with the vacuum packages. The master pouch is evacuated and gas flushing the pocket in a sealed chamber, with a flat covering barrier film, sealed around the perimeter of the pocket by heat sealing to enclose the treatment gas.

In embodiments, the individual VSP packages as arrangement within the master pouch in a single layer. In embodiments, the master pouch contains at least 2, 4, 6, 8, 10 or 12 individual VSP packages.

Modified Atmosphere

As discussed previously, the master pouch contains a modified atmosphere within the package. The interior space of the master pouch comprises an atmosphere that has low residual oxygen. The food product is separated from direct contact with the modified atmosphere by the vacuum package.

In MAP packaging, prior to sealing the opening to the master pouch ambient air is evacuated from the interior of the master pouch and replaced with a gas that differs from ambient air. For example, the packaged food products can be packaged in an environment with desired gas concentrations after evacuating all or most of the air from the package. In embodiments the MAP can pull a vacuum to evacuate the air and/or perform a gas flush with an inert or desired gas. MAP systems are well known to those of ordinary skill in the art. Examples of such MAP packaging are disclosed in U.S. Pat. No. 5,686,126 to Noel et al. and U.S. Pat. No. 5,779,050 to Kocher et al., the entire disclosures of which are hereby incorporated by reference.

Modified atmosphere can be introduced by machines such as an M-Tec Corr-Vac Gas Flushing Device. The M-Tek equipment is designed to evacuate a flexible bag or pouch of the internal air, and backflush with a treatment gas. The opening of the pouch is positioned past the seal bar (can be either impulse seal or hot bar seal-out unit is designed with impulse sealing) and over the evacuation paddles. The "paddles" extend forward into the bag once the cycle begins, by clamping the seal bar closed, to initially evacuate the bag or pouch. The "paddles" have grooves so that as the evacuation nears completion and the material collapses upon itself, these grooves create channels to continue the evacuation. After a programmed vacuum time, the treatment gas is flooded into the bag via a gas connection to the same "paddles." A second or third vacuum cycle can be programmed for more efficient flushing as needed. The gas may be metered into the bag or pouch by a time setting and then the bag or pouch is heat sealed and the cycle is completed.

Additional MAP equipment includes the CV-Tek Horizontal Flow Packer (model HFP), Ulma horizontal flow wrap machine. Such machines having one vacuum nozzle positioned to one side of the open pouch and a gas lance that extends into the bottom of the pouch, on the opposite side of the pouch. Adding additional cycles of gas then vacuum improved the final residual oxygen level to near 0% oxygen. After the final gas cycle to achieve the proper volume of gas within the pouch, the gas lance and vacuum nozzle retract to heat seal the pouch.

In certain embodiments, the modified atmosphere in the master pouch is at least 0.4%, 0.8%, 1.6%, 3.2% or 4% by volume CO based on the total gas content of the modified atmosphere in the master pouch. In embodiments, the modified atmosphere comprises at least 20%, 30%, 40%, 50%, 60%, 70%, 80%, 90% or 95% by volume $CO_2$. In embodiments, the modified atmosphere comprises between 20% and 40% by volume $CO_2$. Beyond the CO and $CO_2$ concentrations recited in this paragraph, in embodiment, the at least 99.9% of the remaining balance is $N_2$. By way of example, in embodiments where the modified atmosphere in the master pouch is 30% $CO_2$ and 1.6% CO, at least 68.3% of the remaining volume would be $N_2$.

The oxygen level within the master pouch can be reduced to a first level in the range of less than 0.05% and in some embodiments less than 0.01%. The reduction in oxygen level can be accomplished using one or more techniques, including but not limited to, evacuation, gas flushing, oxygen scavenging or combinations thereof.

In certain embodiments, it may be desirable to use oxygen absorbers in order to reduce the residual oxygen concentration in the interior space of the pouch to a level of 0.05% or less. In one embodiment, the oxygen absorber may comprise a sachet comprising a chemical composition that scavenges oxygen molecules. Suitable oxygen scavenging compositions may be based on iron, magnesium, copper, enzymes, and mixtures thereof. A commercial example of a suitable oxygen absorber is available from Mitsubishi Gas Chemical America under the product name AGELESS® Oxygen Absorber ZPT-100 MBC or Multisport Technologies FreshPax CR® or FreshPax® Packets. The greater the residual oxygen level initially within the sealed and gas flush master pouch above the critical level of 0.05% oxygen, the greater the capacity of oxygen absorber needed. The oxygen absorber can be tailored to the capability of the gas flush system residual oxygen level.

In an embodiment, the amount of modified atmosphere within the master pouch is from 0.5 to 2 cc per gram of fresh meat food product contained within the master pouch. In another embodiment, the amount of modified atmosphere within the master pouch is from 1.0 to 1.5 cc per gram of fresh meat food product contained within the master pouch. In an embodiment, the amount of carbon monoxide within the master pouch is from 0.004-0.032 cc/g of fresh meat food product contained within the master pouch. In an embodiment, the amount of carbon monoxide within the master pouch is from 0.008-0.016 cc/g of fresh meat food product contained within the master pouch. In an embodiment, the amount of carbon monoxide within the master pouch is at least 0.010 cc/g of fresh meat food product contained within the master pouch.

SUMMARY

The meat products contained within the package described herein will retain acceptable color after the case ready packages are removed from the master pouch. Acceptable color means that the fresh meat food product has a color retention percentage of at least 90%, 85%, 80%, 75% or 70% measured in accordance with the following formula:

$$\text{Color retention percentage} = \frac{\text{Color}_x}{\text{Color 1}} \times 100$$

Color$_1$ is the Hunter LAB a-value of the fresh meat food product in the food package measure on the day the food package is removed from the master pouch; Color$_x$ is the Hunter LAB a-value of the fresh meat food product in the food package measured x days after the food package is removed from the master pouch; and x is at least 3, 4, 5, 6 or 7 days.

In embodiments, Color$_x$ is at least 22 or 25.

In embodiments, the OTR of the permeable film of the case ready package and the concentration of carbon monoxide within the master pouch is selected to ensure that the square of the percentage of carbon monoxide concentration in the master pouch multiplied by the OTR of the permeable film measured in cc (STP)/m2/day/1 atm at 23° C. and 0% relative humidity (RH) as measured in accordance with ASTM D3985 is greater than 2500, 3000 or 3500. For example, a permeable film having an OTR of 10,000 cc (STP)/m2/day/1 atm at 23° C. and 0% relative humidity (RH) as measured in accordance with ASTM D3985 would be paired with a carbon monoxide percentage of at least 0.5% in the master pouch.

Advantageously, embodiments described herein may be helpful in extending the retail shelf life of fresh meat food products.

EXAMPLES

Fresh Ribeyes (Choice grade) less than 10 days old (counting from the pack date) were selected for this trial. Subprimals were cut into ¾ inch thick steaks. Steaks were randomized across all treatments to account for potential variations among the subprimals. Four samples were prepared for each treatment. The steaks were vacuum skin packaged and placed in a master pouch containing a modified atmosphere as specified below.

Color of steak samples were measured using colorimeter at different time points, comparisons were made across samples packaged with different film and in master pouch with varied concentration of CO Packaging Equipment A. Vacuum Packaging Vacuum Packaging Machine The Ultravac 2100, obtained from UltraSource, was used to prepare the vacuum packages containing the fresh read meat food product. The machine has one upper vacuum chamber and two lower chamber each with impulse sealing. The top chamber can swing onto one lower chamber to vacuumize a "bag" (shrink tubing with one end seal) by drawing the air from the open end of the bag. The other uncovered lower chamber can be loaded with bags for the next cycle while in process of evacuating and sealing on the adjacent lower chamber. The impulse seal provides a hermetic seal to the open end of the bag, followed by venting to atmosphere to remove and shrink the bag over the food within.

B. Thermoformed-Vacuum Skin Packaging

An ULMA/Sealed Air Cryovac DARFRESH® Vacuum Skin Packaging Machine model TFS 707 was used to prepare the thermoformed vacuum skin packages. In this process, a flexible top film (crosslinked) comprising a permeable film is preheated between 100-150° C.), and then advanced forward under a heated dome (approximately 200° C.) with a bottom film or formed trays underneath the food product to be skin packaged. The top film is drawn by vacuum upwards into the dome, and immediately thereafter the space around the food is evacuated. Once a certain vacuum pressure has been reached, the top film is released by venting atmospheric air to the top of the dome, thereby collapsing the superheated film onto the food (i.e. skin packaging) and the space around the food is hermetically seal by the latent heat within the film and absence of air due to vacuum pressure. The sealed trays are indexed forward through longitudinal and transverse knives to cut the packages to their final dimensions.

Modified Atmosphere Equipment

CV-TEK Corr-Vac Mark III—HFP was designed and tested with one vacuum nozzle positioned to one side of the open pouch and a gas lance that extends into the bottom of the pouch, on the opposite side of the pouch. It was found this machine design achieved a 0.1% residual oxygen upon purging a low oxygen gas into the bottom of the pouch while simultaneously evacuation from the open end of the pouch, creating a flow of gas. Adding additional cycles of gas then vacuum improved the final residual oxygen level to near 0% oxygen. After the final gas cycle to achieve the proper volume of gas within the pouch, the gas lance and vacuum nozzle retract to heat seal the pouch.

Hunter Lab Color Evaluation

Color evaluation of the packaged steaks was completed by using a HunterLab MiniScan EZ Colorimeter, Model 4500L, Hunter Associates Laboratory, Reston VA Hunter Lab is a unit to measure color of foods and object using CIE color scale. Under this evaluation, L=lightness (white to black) and a=redness/blue and b=yellow/green. Model 4500L, Hunter Associates Laboratory, Reston VA The set up "Color Scale" was used to generate "a" values on packaged fresh meat. The procedures are to standardize the unit with black and white tiles, and then standardize to a green color tile. Three readings were taken on each sample with a light source and lens covering the sample. The three samples are averaged. Replicate samples were averaged for reporting. All value were acquired in accordance with MSEZ User's Manual Version 1.3, the contents of which are incorporated by reference.

Vacuum Skin Packaging (VSP)

The thermoformed vacuum skin packages were prepared from the various lidding films identified below which were attached to a semi-rigid bottom web. The steaks were positioned on the bottom web during the packaging process. A VSP/DARFRESH® packaging system, manufactured by Ulma was used to prepare the thermoformed vacuum skin packages. During the packaging process, the film is pulled by vacuum upwards into a Teflon coated heated dome (200° C.+/−5 C) to superheat the film as it seals to the bottom web only by evacuation of the space between the films. Latent heat transferred to the film prior to venting and collapse over the food and bottom web results in sealing the lidding to the bottom web to thereby create the skin packaged effect.

The bottom film web from which the support member was formed comprised a 16 mil barrier web thermoformed into trays on the thermoforming VSP machinery. The bottom web had the following seven layer structure:

a. Layer 1 comprised a blend of ethylene vinyl acetate and polybutylene having a thickness of 0.3 mils;
b. Layer 2 comprised a linear low density polyethylene having a thickness of 0.3 mils;
c. Layers 3 and 5 comprised a linear low density polyethylene having a thickness of 0.16 mils;
d. Layer 4 comprised ethylene vinyl alcohol having a thickness of 0.2 mils;
e. Layer 6 comprised a blend of linear low density polyethylene and low density polyethylene having a thickness of 0.82; and
f. Layer 7 comprised a second outer layer of the web, and comprised a semi-rigid PVC sheet having a thickness of 14 mils.

The bottom web had a total thickness of 16 mils, an OTR of 10 cc(STP)/m2/24 hrs/1 atm.

The bottom web was formed into a tray on the ULMA VSP machine upon heating with a flat heated plate, and subsequently vacuum forming into a tray mold below. The bottom web was restrained by gripper chains to advance the forming web forward, and the tray molds are removable to change outer perimeter size as well as depth of draw.

Permeable film 1

Permeable film 1 of the lidding had the following five layer structure:
a. Layers 1, the food contact layer having a thickness of 0.44 mil. Comprising a polymer blend of 95% by weight of Linear Low Density Ethylene/Hexene Copolymer (0.918 g/cm$^3$), and 5% Low Density Polyethylene (0.97 g/cm$^3$) blended with silica.
b. Layers 2 having a thickness of 2.21 mils. Comprising an Ethylene/Vinyl Acetate Copolymer having between 10-20 wt % comonomer.
c. Layer 3 having a thickness of 0.60 mils. Comprising a Low Density Polyethylene (0.956 g/cm$^3$).
d. Layers 4 having a thickness of 2.32 mils. Comprising an Ethylene/Vinyl Acetate Copolymer having between 10-20 wt % comonomer.
e. Layers 5, the layer exposed to the elements having a thickness of 0.32 mil. Comprising a polymer blend of 95% by weight of Linear Low Density Ethylene/Hexene Copolymer (0.918 g/cm$^3$), and 5% Low Density Polyethylene (0.97 g/cm$^3$) blended with silica.

Permeable film 1 had a total thickness 5.89 mils.

Permeable Film 2

Permeable film 2 of the lidding had the following five layer structure:
a. Layers 1, the food contact layer having a thickness of 0.30 mil. Comprising a polymer blend of 95% by weight of Linear Low Density Ethylene/Hexene Copolymer (0.918 g/cm$^3$), and 5% Low Density Polyethylene (0.97 g/cm$^3$) blended with silica.
b. Layers 2 having a thickness of 1.50 mils. Comprising an Ethylene/Vinyl Acetate Copolymer having between 10-20 wt % comonomer.
c. Layer 3 having a thickness of 0.41 mils. Comprising a Low Density Polyethylene (0.956 g/cm$^3$).
d. Layers 4 having a thickness of 1.57 mils. Comprising an Ethylene/Vinyl Acetate Copolymer having between 10-20 wt % comonomer.
e. Layers 5, the layer exposed to the elements having a thickness of 0.22 mil. Comprising a polymer blend of 95% by weight of High Density Polyethylene (0.961 g/cm$^3$), and 5% Low Density Polyethylene (0.97 g/cm$^3$) blended with silica.

Permeable film 2 had a total thickness 4.00 mils.

Permeable Film 3

Permeable film 3 of the lidding was two layers of permeable film 6.

Permeable Film 4

Permeable film 4 of the lidding had the following three layer structure:
a. Layer 1 comprised a sealant layer having a thickness of 0.08 mils. Layer 1 comprised a polymer blend of 80% Very Low Density Polyethylene/Octene Copolymer and 20% Linear Low Density Polyethylene (0.918 density).
b. Layer 2 defined a core layer of the film having a thickness of 1.83 mils. Layer 2 comprised Ethylene/Butyl Acrylate Copolymer (0.927 density).
c. Layer 3 comprised a sealant layer having a thickness of 0.08 mils. Layer 3 comprised a polymer blend of 84% Very Low Density Polyethylene (0.902 density), 15% Linear Low Density Polyethylene/Octene Copolymer (0.92 density) and 1% Fluoropolymer in LLDPE (0.92 density).

Permeable film 4 is shrunk and has a total thickness 1.99 mils

Permeable film 5

Permeable film 5 of the lidding had the following three layer structure:
a. Layer 1 comprised a sealant layer having a thickness of 0.08 mils. Layer 1 comprised a polymer blend of 80% Very Low Density Polyethylene/Octene Copolymer and 20% Linear Low Density Polyethylene (0.918 density).
b. Layer 2 defined a core layer of the film having a thickness of 1.83 mils. Layer 2 comprised Ethylene/Butyl Acrylate Copolymer (0.927 density).
c. Layer 3 comprised a sealant layer having a thickness of 0.08 mils. Layer 3 comprised a polymer blend of 84% Very Low Density Polyethylene (0.902 density), 15% Linear Low Density Polyethylene/Octene Copolymer (0.92 density) and 1% Fluoropolymer in LLDPE (0.92 density).

Permeable film 5 is unshrunk and has a total thickness 1.99 mils

Permeable Film 6

Permeable film 6 of the lidding had the following three layer structure:
a. Layer 1 comprised a sealant layer having a thickness of 0.08 mils. Layer 1 comprised a polymer blend of 95% by weight of Linear Low Density Polyethylene/Hexene Copolymer (0.918 g/cm$^3$), and 5% Low Density Polyethylene (0.97 g/cm$^3$) blended with silica.
b. Layer 2 defined a core layer of the film having a thickness of 2.80 mils. Layer 2 comprised a Very Low Density Polyethylene/Octene Copolymer (0.87 g/cm$^3$).
c. Layer 3 defined an outer abuse layer having a thickness of 0.07 mils, and comprised a blend High Density Polyethylene (0.956 g/cm$^3$) 95% by weight, and Low Density Polyethylene (0.956 g/cm$^3$) with silica.

Permeable film 6 had a total thickness 2.95 mils.

Permeable Film 7

Permeable film 7 of the lidding had the following five layer structure:
a. Layers 1 and 2 comprised a sealant layer having a total thickness of 0.08 mil, and comprised a polymer blend of 95% by weight of Linear Low Density Ethylene/Hexene Copolymer (0.918 g/cm$^3$), and 5% Low Density Polyethylene (0.97 g/cm$^3$) blended with silica.
b. Layer 3 defined a core layer of the film having a thickness of 2.80 mils. Layer 2 comprised Very Low Density Polyethylene/Octene Copolymer (0.87 g/cm$^3$).

c. Layer 4 and 5 defined an outer abuse layer having a total thickness of 0.07 mils, and comprised a blend High Density Polyethylene (0.956 g/cm$^3$) 95% by weight, and Low Density Polyethylene (0.956 g/cm$^3$) with silica.

Permeable film 7 had a total thickness 2.95 mils.

Master Pouch

The master pouches used in the examples were prepared from a three layer laminate comprised of an outer barrier/sealant layer (thickness of 1.75 mils); an adhesive layer comprised of isocyanate (thickness of 0.02 mils), and outer nylon layer (thickness of 0.75 mils).

The barrier/sealant layer comprised a coextruded film having the following seven layer structure:
a. Layer 1: blend of a linear low density polyethylene copolymer and a very low density polyethylene copolymer (thickness of 0.20 mils);
b. Layer 2: blend of a linear low density polyethylene copolymer and a low density polyethylene homopolymer (thickness of 0.30 mils);
c. Layer 3: low density polyethylene copolymer (thickness of 0.26 mils);
d. Layer 4: maleic anhydride modified polyethylene (thickness of 0.14 mils);
e. Layer 5: ethylene vinyl alcohol (thickness of 0.20 mils);
f. Layer 6: maleic anhydride modified polyethylene (thickness of 0.14 mils); and
g. Layer 7: blend of a linear low density polyethylene copolymer and a very low density polyethylene copolymer (thickness of 0.51 mils).

The master pouch was manufactured from two identical sheets of the above film. The two sheets of films were superimposed over each other in a face-to-face relations, and heat sealed to each other along opposing side and bottom edges to form a pouch having an opening through which the individual packages can be introduced into the interior space of the pouch. The overall dimensions of the master pouches were 22.75 inches×29 inches. The film had an OTR of 3.1 cc(STP)/m$^2$/24 hrs/1 atm or less.

TABLE 1

| Permeable Film | OTR | # of samples for each level of Carbon Monoxide concentration | | | | 4% Storage CO time |
| --- | --- | --- | --- | --- | --- | --- |
| | | 0.4% CO 30% CO$_2$ | 0.8% CO 30% CO$_2$ | 1.6% CO 30% CO$_2$ | 3.2% CO 30% CO$_2$ | |
| 1 | 2,700-2,800 | 4 | 4 | 4 | 4 | 4 3 days and 14 days in master pouch |
| 2 | 3,400-3,700 | 4 | 4 | 4 | 4 | 4 |
| 3 | 5380-6600 | 4 | 4 | 4 | 4 | 4 |
| 4 | 11,900-12,100 | 4 | 4 | 4 | 4 | 4 |
| 5 | 13,100-13,800 | 4 | 4 | 4 | 4 | 4 |
| 6 | 15,800-16,900 | 4 | 4 | 4 | 4 | 4 |
| 7 | 18,900-21,200 | 4 | 4 | 4 | 4 | 4 |
| Total | | 28 | 28 | 28 | 28 | 28 280 samples |

Hunter a-value of the steaks after 24 h of storage within master pouch. Color was measured while samples were kept within unopened master pouch and the results are shown in FIG. 5-8.

The results shown in FIGS. 5-8 demonstrate that higher carbon monoxide concentration within master pouch facilitated faster color development to an acceptable color level (a-value of at least 22).

Within similar time frame of 24 hours, higher a-value (19.41) was achieved with higher CO concentration (4.0% CO), whereas samples exposed to lower CO (0.4%) had significantly lower a-value (11.37).

Also demonstrated is that the steaks achieved desired redness (a-value score of at least 22) within 72 hours at higher CO concentrations, such as 1.6%. While lower CO concentrations of 0.4% could result in the need for more than 12 days of storage before desired color is achieved (as shown in further examples below).

3-Day Aging

Once the steaks were removed from the master pouch, color degradation would begin due to the being in contact with atmospheric oxygen. As shown in FIGS. 9-15, the samples were allowed to age in the master pouch for 3 days and then removed and placed in a simulated lighted and refrigerated retail display case. The samples subjected to the higher CO levels retained acceptable color longer than those subjected to low CO levels. Day 1 in the charts depicted in FIGS. 9-15 represent the first day in which the VSP was removed from the master pouch.

FIGS. 9-15 demonstrate that the combination of a higher CO concentration in the master pouch, in combination with a covering film having a higher OTR results in less time required in the master pouch and longer acceptable color once the VSP package is removed from the master pouch.

14-Day Aging

Turning now to FIGS. 16-22, samples were allowed to remain in the master pouches for 14 days. The results are depicted in FIGS. 16-22. The results show that even at lower levels of CO concentration in the master pouch, and with a lower OTR film, acceptable color was achieved after a longer aging process.

Referring to FIGS. 23-29, the VSP packages were removed from the master pouch and stored in a simulated retail case. The day of removal was recorded as day 1. Hunter a-value was recorded for each sample and depicted in FIGS. 23-29. It is shown that by aging the samples longer in the master pouch, acceptable color was retained for a longer time period in the simulated retail case.

This written description uses examples to disclose the invention to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A package comprising:
   a. a plurality of food packages containing fresh meat food products;
      i. the plurality of food packages being vacuum packaged to form case ready packages comprising:
         a support and a permeable film;
         the permeable film having an oxygen transmission rate (OTR) of at least 4,000 cc (STP)/m$^2$/day/1 atm at 23° C. and 0% relative humidity (RH) as measured in accordance with ASTM D3985;

b. the plurality of food packages contained within a sealed master pouch being made from a film having an OTR less than 100 cc (STP)/m²/day/1 atm at 23° C. and 0% relative humidity (RH) as measured in accordance with ASTM D3985;
c. the sealed master pouch comprising a modified atmosphere comprising nitrogen, carbon dioxide, at least 0.6% by volume carbon monoxide and less than 0.05% oxygen;
such that a color retention percentage of the fresh meat food product is at least 70% measured in accordance with the following formula:

$$\text{Color retention percentage} = \frac{Color_x}{Color\ 1} \times 100$$

$Color_1$ is a Hunter LAB a-value of the fresh meat food product in the case ready package measured on the day the food package is removed from the master pouch;
$Color_x$ is a Hunter LAB a-value of the fresh meat food product in the case ready package measured x days after the food package is removed from the master pouch; and
x is at least 3 days.

2. A method for packaging a product comprising the steps of:
a. situating at least one fresh meat food product on a support;
b. vacuum packaging the at least one fresh meat food product between the support and a permeable film to form a case ready package;
i. the permeable film having an oxygen transmission rate (OTR) of at least 4,000 cc (STP)/m2/day/1 atm at 23° C. and 0% relative humidity (RH) as measured in accordance with ASTM D3985;
c. situating a plurality of the case ready package within a master pouch being made from a film having an OTR less than 100 or 10 cc (STP)/m²/day/1 atm at 23° C. and 0% relative humidity (RH) as measured in accordance with ASTM D3985;
d. sealing the case ready package within the master pouch as a modified atmosphere package;
i. the modified atmosphere comprising nitrogen, carbon dioxide, at least 0.6% by volume carbon monoxide and less than 0.05% oxygen;
e. retaining the case ready package within the master pouch for at least 3 days;
f. such that a color retention percentage of the fresh meat food product is at least 70% measured in accordance with the following formula:

$$\text{Color retention percentage} = \frac{Color_x}{Color\ 1} \times 100$$

$Color_1$ is a Hunter LAB a-value of the fresh meat food product in the case ready package measured on the day the case ready package is removed from the master pouch;
$Color_x$ is a Hunter LAB a-value of the fresh meat food product in the case ready package measured x days after the case ready package is removed from the master pouch; and
x is at least 3 days.

3. A package comprising:
a. a plurality of food packages containing fresh meat food products;
i. the plurality of food packages being vacuum packaged to form case ready packages comprising:
1. A support and a permeable film;
the permeable film having an oxygen transmission rate (OTR) of at least 4,000 cc (STP)/m²/day/1 atm at 23° C. and 0% relative humidity (RH) as measured in accordance with ASTM D3985;
b. the plurality of food packages contained within a sealed master pouch being made from a film having an OTR less than 100 cc (STP)/m²/day/1 atm at 23° C. and 0% relative humidity (RH) as measured in accordance with ASTM D3985;
c. the sealed master pouch comprising a modified atmosphere comprising nitrogen, carbon dioxide, a carbon monoxide concentration of greater than 0.6% by volume and less than 0.05% by volume oxygen;
such that the square of the percentage of carbon monoxide concentration in the master pouch multiplied by the OTR of the permeable film measured in cc (STP)/m²/day/1 atm at 23° C. and 0% relative humidity (RH) as measured in accordance with ASTM D3985 is greater than 2500.

4. The package of claim 3, wherein the permeable film is non-perforated.

5. The package of claim 4, wherein the permeable film comprises at least 90% by weight of a very low density polyethylene copolymer.

6. The package of claim 3 wherein the meat food product is a fresh red meat food product.

7. The package of claim 3 wherein the support is a semi-rigid tray comprising PET, APET, CPET or RPET.

8. The package of claim 3 wherein the support has an OTR of at least 5,000 cc (STP)/m²/day/1 atm at 23° C. and 0% relative humidity (RH) as measured in accordance with ASTM D3985.

9. The package of claim 3 wherein a color retention percentage of the fresh meat food product is at least 70% measured in accordance with the following formula:

$$\text{Color retention percentage} = \frac{Color_x}{Color\ 1} \times 100$$

$Color_1$ is a Hunter LAB a-value of the fresh meat food product in the case ready package measured on the day the food package is removed from the master pouch;
$Color_x$ is a Hunter LAB a-value of the fresh meat food product in the case ready package measured x days after the food package is removed from the master pouch; and
x is at least 3 days.

10. The package of claim 9, wherein the meat food product is a fresh red meat food product and the fresh red meat has a $Color_x$ value of at least 22 or of at least 25.

11. The package of claim 10, wherein x is at least 5 days.

12. The package of claim 3, wherein the modified atmosphere has carbon monoxide concentration of at least 1.6%.

13. The package of claim 3 wherein the modified atmosphere has carbon monoxide concentration of between 1.2% and 3.5% by volume.

14. The package claim 3 wherein the plurality of food packages are selected from the group consisting of vacuum shrink bag or vacuum skin packages.

15. The package of claim 3 wherein the plurality of food packages in the master pouch is at least 4 packages.

16. The package of claim 3 wherein the modified atmosphere consists essentially of nitrogen, carbon dioxide, at least 0.8% by volume carbon monoxide and less than 0.05% oxygen.

17. The package of claim 3 wherein the modified atmosphere within the master pouch is present in amount from 1.0 to 1.5 cc per gram of fresh meat food product contained within the master pouch.

18. The package of claim 3 wherein the modified atmosphere within the master pouch has carbon monoxide present in amount of at least 0.008 cc per gram of fresh meat food product contained within the master pouch.

19. The package of claim 3 wherein the master pouch does not contain an oxygen absorber sachet.

20. The package of claim 3 wherein the sealed master pouch comprising less than 0.01% oxygen.

\* \* \* \* \*